(12) United States Patent
Ichikawa et al.

(10) Patent No.: US 8,402,316 B2
(45) Date of Patent: Mar. 19, 2013

(54) METHOD OF TESTING COMPUTER, COMPUTER TEST APPARATUS AND NON-TRANSITORY COMPUTER-READABLE MEDIUM

(75) Inventors: Fumio Ichikawa, Kawasaki (JP); Tamoru Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 13/086,012

(22) Filed: Apr. 13, 2011

(65) Prior Publication Data

US 2011/0296147 A1    Dec. 1, 2011

(30) Foreign Application Priority Data

May 31, 2010    (JP) ................................. 2010-125148

(51) Int. Cl.
*G06F 11/00* (2006.01)
(52) U.S. Cl. ................. 714/33; 714/25; 714/37
(58) Field of Classification Search ............ 714/25, 714/33, 37
See application file for complete search history.

(56) References Cited

U.S. PATENT DOCUMENTS

| | | | |
|---|---|---|---|
| 2005/0034017 A1* | 2/2005 | Airaud et al. | 714/25 |
| 2007/0168748 A1* | 7/2007 | Musoll | 714/38 |

FOREIGN PATENT DOCUMENTS

| | | |
|---|---|---|
| JP | 02-244338 | 9/1990 |
| JP | 06-324904 | 11/1994 |
| JP | 2001-222442 | 8/2001 |

* cited by examiner

*Primary Examiner* — Scott Baderman
*Assistant Examiner* — Sarai Butler
(74) *Attorney, Agent, or Firm* — Fujitsu Patent Center

(57) ABSTRACT

A method of testing a computer, the method has designating a register as an input-only register having a setting of a value which does not cause an exception interruption with an execution of a specific type of instruction, generating a test instruction array having a plurality of instructions for a test, by assigning a register excluding the input-only register as an output destination of an execution result of each of the plurality of instructions, executing the plurality of instructions included in the generated test instruction array, and evaluating the execution results by the computer.

15 Claims, 21 Drawing Sheets

FIG. 6

AVOIDANCE CONDITION UPON EXCEPTION INTERRUPTION

| INSTRUCTION TYPE | EXCEPTION INTERRUPTION | AVOIDANCE CONDITION |
|---|---|---|
| FLOATING-POINT ARITHMETIC | • WHEN OVERFLOW OCCURS<br>• WHEN RESULT OF OPERATION IS NaN<br>... | SET AT LEAST ONE OF INPUT VALUES TO VALUE CLOSE TO 1 |
| FIXED-POINT DIVISION | • WHEN DIVISOR IS 0 | SET DIVISOR TO VALUE EXCEPT FOR 0 |

| INSTRUCTION | FIRST INPUT REGISTER | | SECOND INPUT REGISTER | | OUTPUT REGISTER |
|---|---|---|---|---|---|
| fdiv | INPUT-ONLY | ÷ | INPUT-ONLY | = | INPUT/OUTPUT |

| RANDOM NUMBER | 11011 | 01101 | 00110 |
|---|---|---|---|
| AND DATA | 10111 | 10111 | 10111 |
| OR DATA | 00000 | 00000 | 01000 |

| GENERATED | 10011 | 00101 | 01110 |
|---|---|---|---|

= fdiv, fr19, fr05, fr14

FIG. 11

| INSTRUCTION | FIRST INPUT REGISTER | | SECOND INPUT REGISTER | | OUTPUT REGISTER |
|---|---|---|---|---|---|
| fand | ALL | & | ALL | = | INPUT/OUTPUT |

| RANDOM NUMBER | 10011 | | 11011 | | 00111 |
|---|---|---|---|---|---|
| AND DATA | 11111 | | 11111 | | 10111 |
| OR DATA | 00000 | | 00000 | | 01000 |

| GENERATED | 10011 | | 11011 | | 01111 |
|---|---|---|---|---|---|

= fand, fr19, fr27, fr15

FIG. 12

| OP CODE | FIRST INPUT REGISTER | SECOND INPUT REGISTER | OUTPUT REGISTER |
|---|---|---|---| op21

| fadd | fr10 | fr12 | fr14 |
|---|---|---|---| op22

| fsubd | fr14 | fr16 | fr18 |
|---|---|---|---|

| INSTRUCTION DEFINITION STRUCTURE TABLE | | | | ~62 |
|---|---|---|---|---|
| INSTRUCTION | 4 BYTES AND DATA | 4 BYTES OR DATA | 1 BYTE CONFLICT FLAG | |
| for | 0x1e07c01f | 0xa1b00f80 | 1011 | |
| fadd | 0x1e03c00f | 0xa1a00840 | 1000 | |
| fsubd | 0x1e03c00f | 0xa1a008c0 | 1000 | |
| fmuld | 0x1e03c00f | 0xa1a00940 | 1000 | |
| ⋮ | ⋮ | ⋮ | ⋮ | |

METHOD OF TESTING COMPUTER, COMPUTER TEST APPARATUS AND NON-TRANSITORY COMPUTER-READABLE MEDIUM

CROSS-REFERENCE TO RELATED APPLICATION

This application is based upon and claims the benefit of priority of the prior Japanese Patent Application No. 2010-125148, filed on May 31, 2010, the entire contents of which are incorporated herein by reference.

FIELD

The present invention relates to computer test methods, computer test apparatuses and computer test programs.

BACKGROUND

Hitherto, a computer is caused to execute a test program to perform an operation check test for checking an operation in order to exam the validity of a logic design of the computer or examine an operation of a manufactured computer. There have been known operation check tests such as a high load test for checking whether a computer can normally operate with a load state or not and a conflict test for checking whether a computer can normally operate when a conflict occurs in pipeline processing or not.

For the high load test, an instruction array for test may be required to generate for causing a computer to have a high load state. For the conflict test on the other hand, an instruction array for test may be required to generate for causing a computer to have a conflict state. For example, a scoreboard with which whether registers are in use or not is registered may be used to select a register to be used in instructions and thus generate an instruction array for obtaining a conflict state.

A test instruction array may be a random instruction array for which values of operands of instructions and/or registers designated as operands are generated at random.

However, when an "interruption" occurs while a computer is executing an instruction array for a high load test or conflict test, the computer exits from the test operation until exception processing performed for the interruption ends. This prevents generation of the originally intended high load state or conflict state. The interruption causing a computer to perform exception processing in this way is called an exception interruption.

The exception interruption may occur in a fixed point division in which a division is performed with a divisor "0", for example. This may require error processing, and the computer therefore terminates the subsequent instructions and performs exception processing of executing a subroutine for error processing. Exception interruption may also occur in a floating point arithmetic with overflow. The occurrence of such overflow causes a computer to stop the subsequent instructions and executes exception processing of performing a subroutine for processing the overflowing value. In this way, when an exception interruption occurs during a high load test or conflict test and the computer is caused to shift to a subroutine for the exception processing, the computer is prevented from acquiring the originally intended high load state or conflict state until the subroutine for exception processing ends.

The prior art has been known which suppresses the occurrence of an exception interruption in testing a computer by using a test instruction array. For example, there has been known a technology which acquires a test instruction array with fewer exception interruptions by changing the conditions such as operand data and/or arithmetic data, for example, for an instruction in which an exception interruption may possibly occur when a computer generates a test instruction array. For the instruction in which an exception interruption has occurred when a computer executed a test instruction array, a technology has been known which stores the parameter causing the exception interruption and excludes the cause parameter from the next test instruction array. Reference may be made to Japanese Laid-open Patent Publication No. 2-244338, Japanese Laid-open Patent Publication No. 6-324904, and Japanese Laid-open Patent Publication No. 2001-222442.

A computer writes the execution result of an instruction with a designated register number to a designated register as an output destination. Thus, when the computer executes the test instruction array, the value that the register holds changes as the processing advances. Therefore, from a test instruction array with a random register number designated as an operand, the value stored in the register is not available in advance when the instruction is executed.

Because the values of the registers are not available in advance when the instruction is executed, an exception interruption may possibly occur with some combinations of values held by the registers when the instruction is executed. For example, when a computer executes a division instruction in which a division is performed by using the value of a register as a divisor, and if the preceding instruction has written "0" to the register, a division instruction with the divisor 0 is performed as a result, thus causing an exception interruption. Similarly, when a computer executes a floating point arithmetic by using the value of a register as an input, the arithmetic result may overflow with some values written to the register by the preceding instruction, also causing an exception interruption.

In this way, for a test using an instruction with a random register number as an operand, it is difficult to identify the correspondence between the instruction and the execution result in advance and set a combination of an instruction and an execution result which may not cause an exception interruption. For that, some combinations of instructions and execution results may possibly cause an exception interruption, and it has been difficult to eliminate the possibility of causing an exception interruption.

The prior art which changes the condition such as operand data assumes that the data of an operand is identified before a test is started. When a test is performed by using the instruction with a register number as an operand, the possibility of causing an exception interruption may still remain.

In the prior art that excludes the parameter of an instruction in which an exception interruption has occurred from the next test instruction array, a cause parameter may not be excluded from the next test instruction array until an exception interruption occurs with it at least once, and it is difficult to prevent the occurrence of the exception interruption. In addition, as the number of stored parameters increases, the frequency of occurrence of exception interruptions can be reduced. However, the occurrence of exception interruptions may not be suppressed unless all parameters which may possibility cause exception interruptions are stored.

In this way, according to the prior arts, the occurrence of exception interruptions may not be eliminated in testing by using an instruction having a random register number as an operand in a test instruction array. A problem also exists that an exception interruption may not be prevented in advance even when the parameters relating to the exception interruptions having occurred in the past are stored.

SUMMARY

According to an aspect of an invention, a method of testing a computer, the method has designating a register an input-only register having a setting of a value which does not cause an exception interruption with an execution of a specific type of instruction, generating a test instruction array having a plurality of instructions for a test, by assigning a register excluding the input-only register as an output destination of an execution result of each of the plurality of instructions, executing the plurality of instructions included in the generated test instruction array, and evaluating the execution results by the computer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating instruction types which may possibly cause an exception interruption and examples of an exception occurrence avoidance condition.

FIG. 11 is an explanatory diagram of a concrete example of the generation of an fand instruction.

FIG. 12 is an explanatory diagram on a conflict.

DESCRIPTION OF EMBODIMENTS

Embodiments of a computer test method, computer test apparatus and computer test program disclosed in the subject application will be described in detail with reference to drawings. The embodiments do not limit the disclosed art.

First Embodiment

Figure 1:
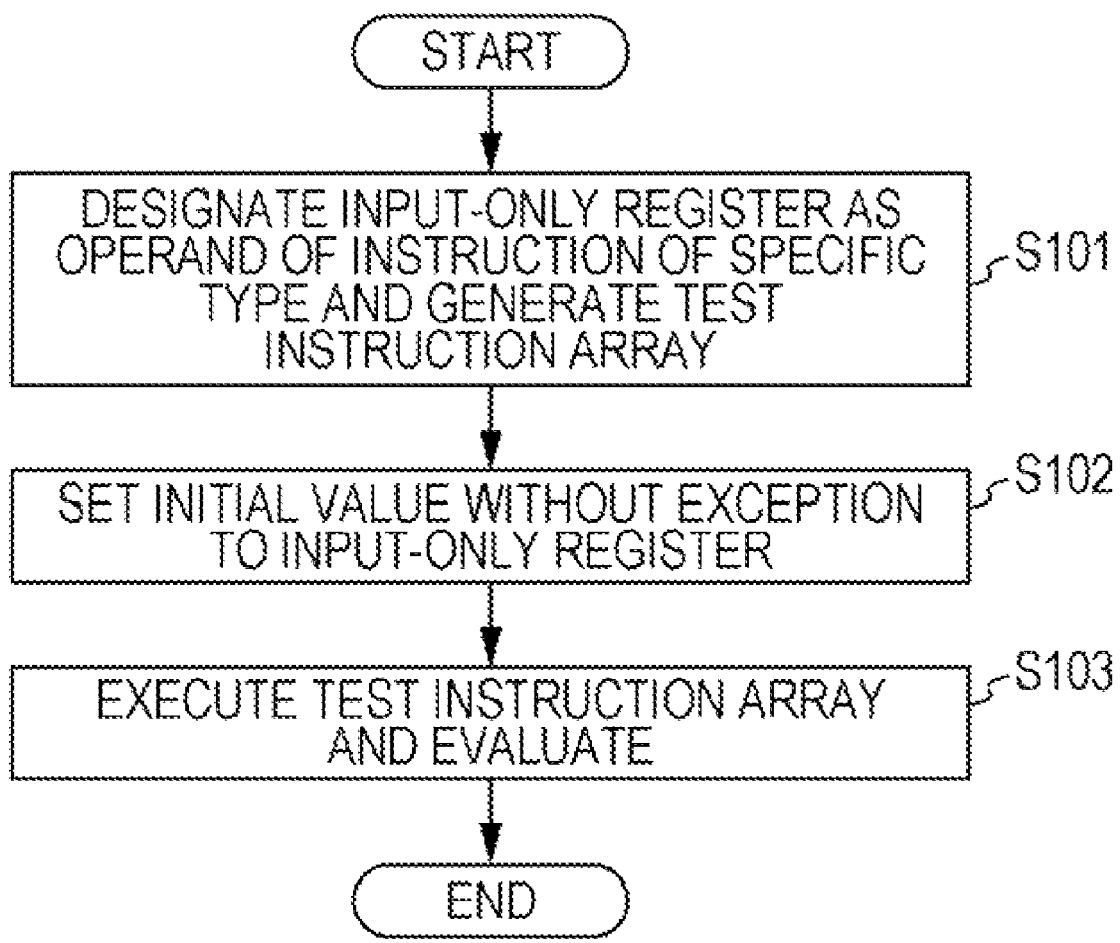
FIG. 1 is a flowchart of a computer test method according to a first embodiment.

FIG. 1 is a flowchart of a computer test method according to a first embodiment. The processing operation illustrated in FIG. 1 is executed by a computer to be tested. First of all, the computer generates a test instruction array having a plurality of instructions for a test which designate output destinations of execution results of the instructions from registers excluding a register with which an execution result is no to be written from a plurality of registers. The register to which an execution result is to be written becomes an input-only register which holds a value set as an initial value. If an instruction is of a specific type, the computer further designates an input-only register as a register for holding an input value to be used for executing the instruction (S101).

After the test instruction array is generated, the computer sets an initial value to a register. Here, the computer sets initial values which do not cause an exception interruption corresponding to the instruction type to the input-only registers (S102).

After the initial values are set to the registers, the computer sequentially executes a plurality of instructions included in the test instruction array and evaluates the execution results (S103). The computer may execute the test instruction array a plurality of number of times, for example, and compare the execution results for the execution result evaluation.

Next, the test instruction array to be generated in S101 by the computer will further be described. Each of the plurality of instructions included in a test instruction array includes an op code from which an instruction type can be identified and an operand indicating data handled by the instruction. The operand indicates a register or a memory address which is the source of data to be used as an input value of an instruction or a register or memory address to which the output value of an instruction is to be written. Among the operands, one indicates the register number to be used as an input to an instruction is called a source register, or input register. Further among the operand, one indicates the register number to which the output value of the executed instruction is to be written is called a destination register or output register.

Figure 2:
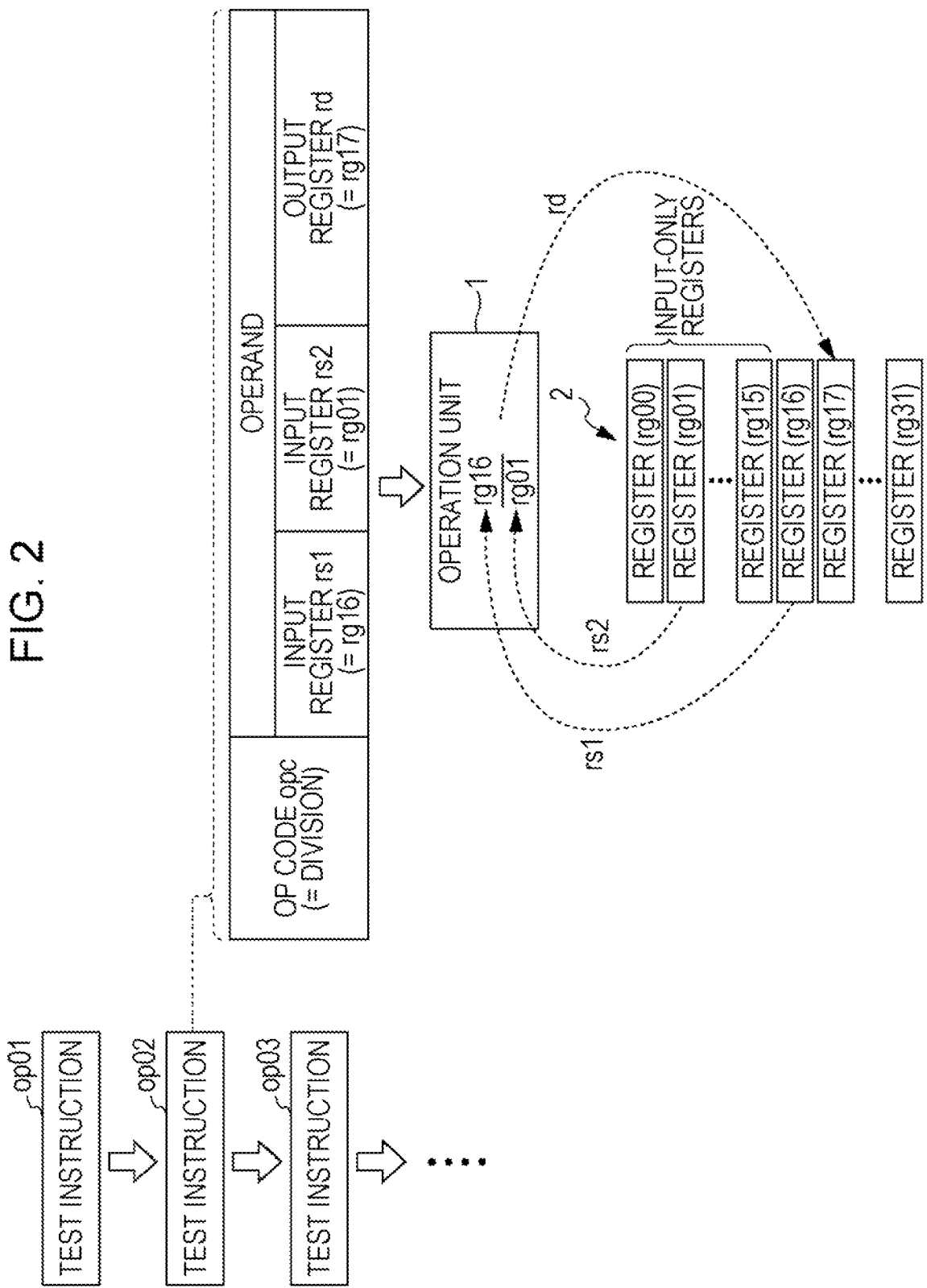
FIG. 2 is an explanatory diagram of a test instruction array.

A concrete example of the test instruction array will be described. FIG. 2 is an explanatory diagram of a test instruction array. In the example illustrated in FIG. 2, the test instruction array includes test instructions op01, op02, and op03. Each of the instructions has an op code and operands. For example, the test instruction op02 may have an op code opc, an input register rs1, an input register rs2, and an output register rd. Among them, the input register rs1, input register rs2, and output register rd are operands.

The op code opc is a bit array from which the type of an instruction can be identified. Each of the input register rs1 and input register rs2 is a bit array indicating the register number of a register to be used as an input to an instruction. The output register rd is a bit array indicating the register number of a register which stores an execution result of an instruction.

In the example illustrated in FIG. 2, the op code opc in the test instruction op02 indicates a division in which the value read from the input register rs1 is divided by the value read from the input register rs2. The input register rs1 indicates a register rg16 in a register set 2 having 32 registers from a register rg00 to a register rg31. In the same manner, the input register rs2 indicates a register rg01 in the register set 2. The output register rd indicates a register rg17 in the register set 2.

An operation unit 1 in the computer writes in the register rg17 the result of the division of the value read from the register rg16 by the value read from the register rg01 when the test instruction op02 is executed.

The operation unit 1 outputs an error if the divisor is 0 in a division, and an exception interruption occurs. In order to avoid the occurrence of the exception interruption when the operation unit 1 performs a division, the value read from the input register to be used as a divisor may be required to be equal to a value except for 0.

However, when the operation unit 1 uses the output register of the preceding instruction as the input register to be used as the divisor, the execution of the preceding instruction may rewrite the value to the input register, and the value of the divisor within the input register may be 0. Accordingly, when the computer generates a test instruction, partial registers are assigned for input only, and an input register holding a divisor is selected from input-only registers. The computer further selects an output register of an instruction from the registers excluding the input-only registers.

Thus, the information held by the input-only registers holding divisors is not rewritten by the execution of the instructions, and the initial values are maintained. Therefore, the initial value of an input-only register which is a value except for 0 allows the avoidance of the occurrence of an exception interruption due to a divisor which is 0 upon execution of the division by the operation unit 1.

In the example illustrated in FIG. 2, the 16 registers from the register rg00 to the register rg15 in the register set 2 are input-only registers. The 16 registers from the register rg16 to the register rg31 in the register set 2 are input/output registers each of which can be used as an output register and an input register.

The register rg01 holding a divisor to be used when the operation unit 1 executes the test instruction op02 is an input-only register. For that, presetting a value except for 0 as the initial value of the register rg01 by the computer allows the avoidance of the occurrence of an exception interruption when the operation unit 1 executes the test instruction op02.

When the operation unit 1 performs a division, the dividend may be any value. Thus, any of the input-only register and the input/output register may be used as the input register corresponding to the dividend. In the test instruction op02, the input register rs1 corresponding to the dividend is the register rg16 which is an input/output register.

In this way, when a computer generates a test instruction array, using partial registers as input-only registers, selecting a divisor from the input-only registers and setting a value except for 0 as the initial values of the input-only registers allows the occurrence of an exception interruption in the division.

When a computer generates an instruction except for a division which may possibly cause an exception interruption with some input values, selecting an input-only register as an input register allows the avoidance of occurrence of an exception interruption. The instruction which may possibly cause an exception interruption with some input values may be floating point arithmetic. For example, when the computer performs multiplication by floating point arithmetic, the arithmetic result may exceed a representable upper limit and overflow with some combinations of input values, and the computer moves to exception processing. When a computer performs a multiplication by floating point arithmetic, selecting at least one of input values from the input-only registers and presetting a value which does not cause an exception interruption such as 1 as the initial value of the input-only registers allows the avoidance of occurrence of an exception interruption.

When generating an instruction which does not cause an exception interruption, the computer may select any of input/output registers and input-only registers as the input registers. Even in an instruction which causes an exception interruption, an input register holding a value not related to the occurrence of an exception interruption, such as a dividend of a division, may be selected from either input/output register or input-only register by the computer.

As described above, a computer test method according to the first embodiment sets an input-only register as an input register of an instruction of a specific type which may possibly cause an exception interruption with some input values in an test instruction. The computer test method according to the first embodiment sets an initial value as a value which can avoid the occurrence of an exception interruption to an input-only register and executes the test instruction array.

Thus, the computer test method according to the first embodiment can suppress the occurrence of an exception interruption and exception processing efficiently and in advance. Therefore, the computer test method according to the first embodiment can rewrites the values of the registers and perform a test without the occurrence of an exception interruption and exception processing. Compared with the technology which executes and corrects a test instruction array to avoid the occurring exception interruption, the computer test method according to the first embodiment generates a test instruction array without the occurrence of an exception interruption in short time.

Second Embodiment

Figure 3:
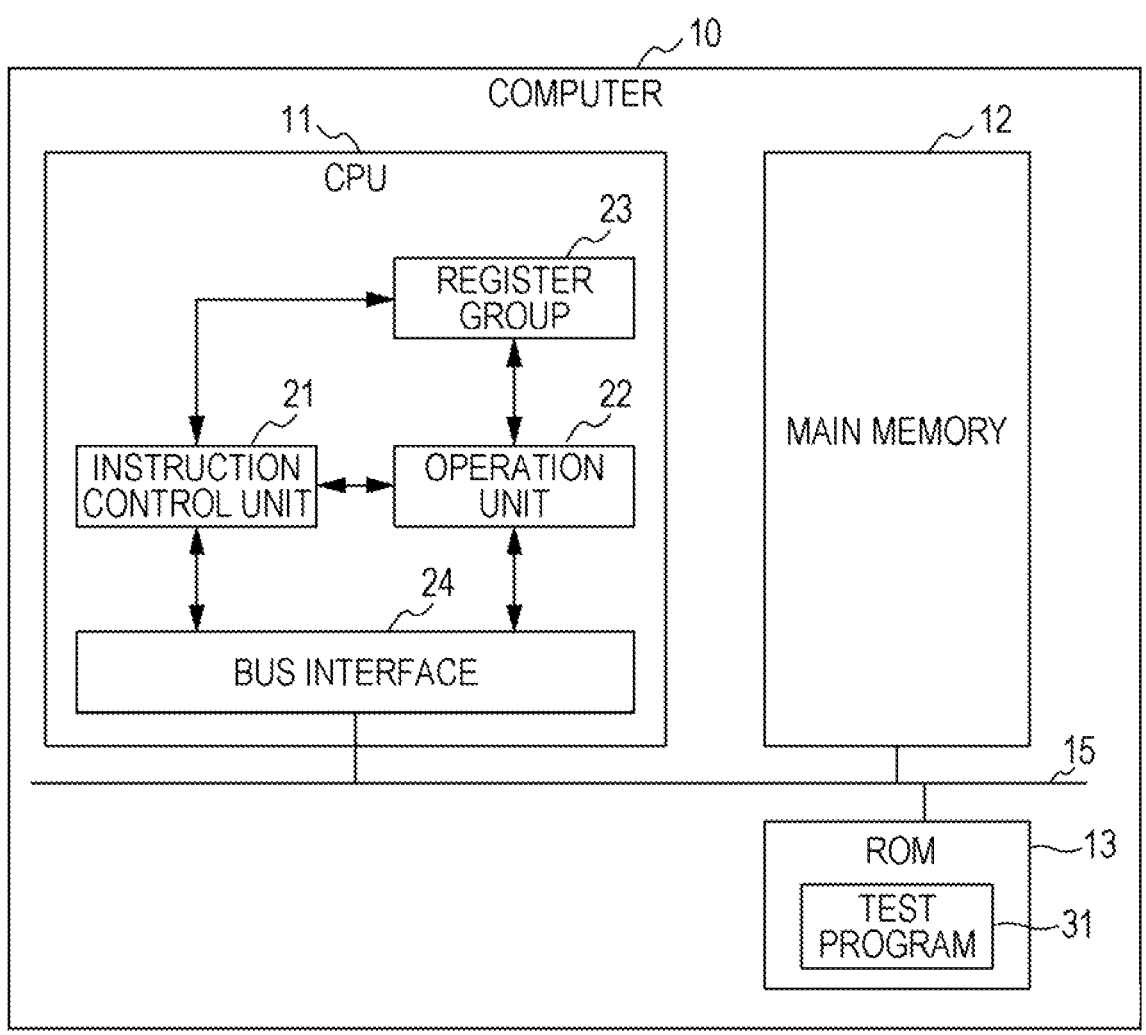
FIG. 3 is a schematic configuration diagram illustrating a schematic configuration of a computer test apparatus according to a second embodiment.

FIG. 3 is an schematic configuration diagram illustrating a schematic configuration of a computer test apparatus according to a second embodiment. A computer 10 illustrated in FIG. 3 includes a CPU (Central Processing Unit) 11, a main memory 12, a ROM (Read Only Memory) 13, and a bus 15. The CPU 11, main memory 12, and ROM 13 are connected to the bus 15 and exchange data via the bus 15.

The CPU 11 is an operation apparatus which operates by using the main memory 12 as a main storage device and internally includes an instruction control unit 21, an operation unit 22, a register group 23, and a bus interface 24. The instruction control unit 21 is a processing unit which decodes an instruction and performs processing sequence control. More specifically, the instruction control unit 21 reads and interprets an instruction to be processed by the CPU 11 and outputs the interpretation result. The operation unit 22 is a processing unit which performs an operation. More specifically, the operation unit 22 reads data to be instructed and performs an operation in accordance with the instruction interpreted by the instruction control unit 21 and outputs the operation result.

The register group 23 has a plurality of register sets which hold information such as an operation result by the operation unit 22. The bus interface 24 is an interface provided between the instruction control unit 21 and operation unit 22 and the bus 15.

The instruction control unit 21 reads and executes an instruction from a program decompressed in the main memory 12. The instruction control unit 21 may return the execution result to the main memory 12 or stores it to the register group 23. The operation unit 22 reads from and executes an operation on an input value of the operation instructed by the instruction control unit 21 from the main memory 12 or register group 23 and returns the execution result to the main memory 12 or stores it to the register group 23.

The ROM 13 may be a flash memory, for example, and stores a program to be executed by the CPU 11, for example. Storing the test program 31 in the ROM 13 and executing the test program 31 by the CPU 11 causes the computer 10 to function as a computer test apparatus which tests its operation.

Alternatively, the computer 10 may be connected to an external device via an arbitrary interface, not illustrated. The computer 10 receives and executes a test program from an external device to function as a computer test apparatus which tests its operation.

Figure 4:
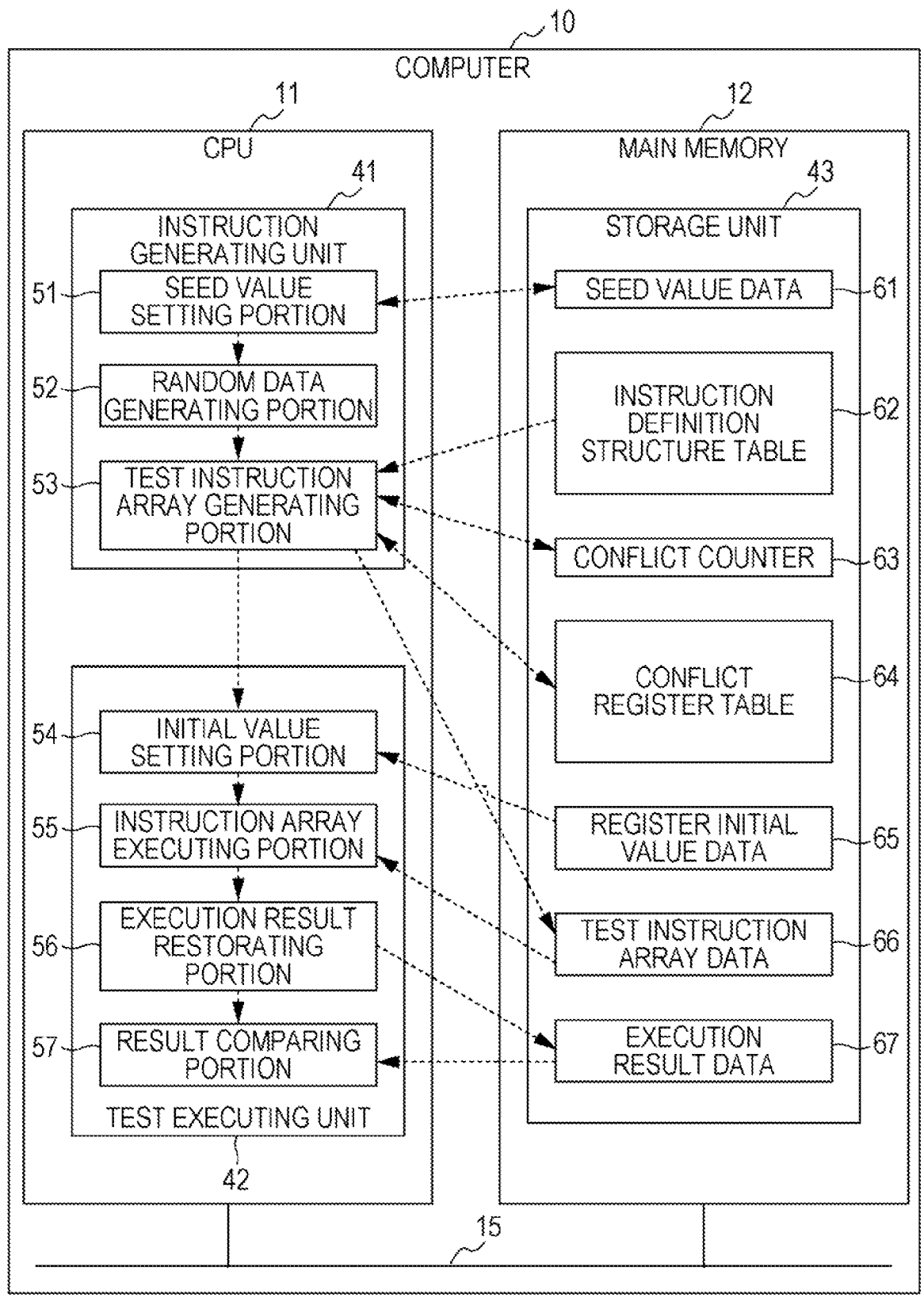
FIG. 4 is an explanatory diagram of a computer which executes a test program.

FIG. 4 is an explanatory diagram of a computer which executes a test program. The CPU 11 executes the test program 31 so that the CPU 11 can implement the functions of an instruction generating unit 41 and a test executing unit 42. When executing the test program 31, the CPU 11 uses the main memory 12 as a storage unit 43. The CPU 11 may use an arbitrary storage medium as the storage unit 43, without limiting to the main memory 12. The CPU 11 may distribute data over a plurality of storage mediums and use them as the storage unit 43.

The instruction generating unit 41 has a seed value setting portion 51, a random data generating portion 52, and a test instruction array generating portion 53. The seed value setting portion 51 sets a seed value to be used for generation of a random number part of a test instruction array. When the seed value setting portion 51 defines a seed value newly, the seed value setting portion 51 stores the newly defined seed value to the storage unit 43 as seed value data 61. When a predetermined seed value is used, the seed value setting portion 51 reads the seed value data 61 and sets it as the seed value.

The random data generating portion 52 generates a pseudo-random array by using the seed value set by the seed value setting portion 51 as its initial value, sequentially extracts data having an equal length to that of the test instruction from the pseudo-random array and generates random data.

The test instruction array generating portion 53 generates a test instruction array from the random data generated by the random data generating portion 52 and stores it to the storage unit 43 as test instruction array data 66. For the generation of a test instruction array from random data, an instruction definition structure table 62, a conflict counter 63, and a conflict register table 64 are used. The details of the test instruction array generation from random data will be described below.

The test executing unit 42 is a processing unit which uses the test instruction array data 66 generated by the instruction generating unit 41 to test and has an initial value setting portion 54, an instruction array executing portion 55, an execution result saving portion 56, and a result comparing portion 57.

The initial value setting portion 54 reads the register initial value data 65 from the storage unit 43 and sets it to a register.

In other words, the storage unit 43 functions as a register initial value data storage unit which stores the register initial value data 65.

After the initial value setting portion 54 sets the initial value, the instruction array executing portion 55 reads and executes the test instruction array data 66 from the storage unit 43. The execution result saving portion 56 stores the execution result by the instruction array executing portion 55 as execution result data 67 in the storage unit 43. The instruction array executing portion 55 then reads and executes the test instruction array data 66 again. The result comparing portion 57 compares the second execution result by the instruction array executing portion 55 and the execution result data 67 for evaluation. In other words, the instruction array executing portion 55 and the result comparing portion 57 work together to function as an evaluation processing unit.

For example, if the second execution result by the instruction array executing portion 55 does not agree, the result comparing portion 57 evaluates that some error may have occurred during the execution of the test instruction array. The error which may occur during the execution of a test instruction array may be a delay in operation, for example. If a delay in operation occurs during the execution of a test instruction array, the processing sequence on the instruction may be disrupted, and some data error may occur. The data error may result in different values generated by the execution of the test instruction array. Thus, the result comparing portion 57 can evaluate the presence of an error through the comparison of the second execution result. Alternatively, the delay in operation on an instruction may be detected by further providing an operation check unit to monitor the state during the execution of a test instruction array.

Figure 5:
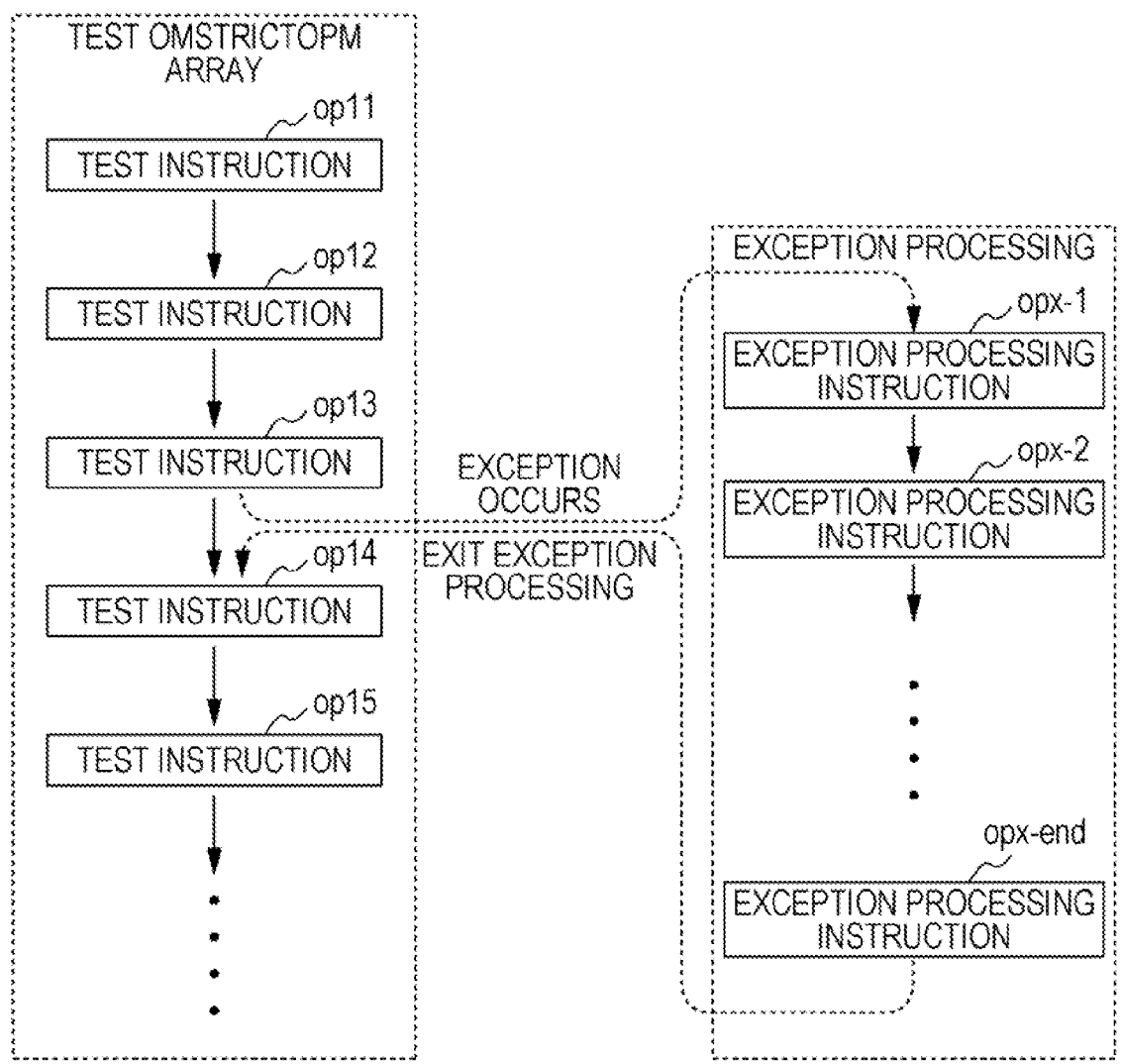
FIG. 5 is an explanatory diagram on exception processing.

Next, problems caused by exception processing will be described. FIG. 5 is an explanatory diagram on exception processing. When the test instruction array illustrated in FIG. 5 is executed, the CPU 11 first executes a test instruction op11 and then sequentially executes a test instruction op12, a test instruction op13 and so on.

The test instruction array defines that the test instruction op13 is to be executed first, and the test instruction op14 is then to be executed. However, if the execution of the test instruction op13 results in an exception interruption, the CPU 11 moves to exception processing.

In the exception processing, the CPU 11 sequentially executes an exception processing instruction opx-1, an exception processing instruction opx-2 and so on. If the last exception processing instruction opx-end is executed and the exception processing ends, the CPU 11 returns to the processing on the test instruction array.

In the example illustrated in FIG. 5, an exception interruption occurs in the test instruction op13. Thus, the CPU 11 executes the test instruction op14 and test instruction op15 after the end of the exception processing and advances the processing on the test instruction array.

In this way, if an exception interruption occurs during the execution of a test instruction array, the CPU 11 executes an instruction for the exception processing. The execution of an instruction relating to the exception processing is not intended during a test. Therefore, if an exception interruption occurs and the CPU 11 exits from the operation on the test instruction array, the CPU 11 may not maintain the state intended by the test instruction array.

For a high load test, for example, instructions are serially submitted to the pipeline of a CPU, and a high load state is acquired to examine the operation by the CPU or computer. If an exception interruption occurs during the execution of the test instruction array generated for the high load test by a computer, the high load state may be cancelled.

In a conflict test, a computer submits an instruction having an output register of the preceding instruction designated as an input register to the pipeline to obtain a conflict state and then examines the operation. If an exception interruption occurs during the execution of the test instruction array generated for the conflict test by a computer, an intended conflict state may not occur. Against this problem, the computer 10 according to this second embodiment divides registers into an input/output register and an input-only register and uses the input-only register for the input value of an instruction which may possibly cause an exception interruption, allowing the avoidance of occurrence of an exception interruption, like the first embodiment.

The instruction which may possibly cause an exception and the avoidance of occurrence of an exception will be described. FIG. 6 is an explanatory diagram illustrating instruction types which may possibly cause an exception interruption and examples of an exception occurrence avoidance condition. If the instruction type is a floating point arithmetic, a computer may cause an exception interruption with some input values. More specifically, a computer may cause an exception interruption when overflow occurs as a result of an integration or if the operation result is an NaN. In order to avoid the occurrence of an exception interruption in a floating point arithmetic, a value which can prevent the occurrence of an exception interruption with any other input values may be used as at least one of input values to be used for an arithmetic by a computer. More specifically, 1 or a value that is close to 1 such as a value in the range of 0.9 to 1.1 may be used as one input value of a floating point arithmetic. The input value range may be set arbitrarily as far as an exception interruption does not occur as a result of a floating point arithmetic with any other input value.

If the instruction type is a fixed point division, a computer causes an exception interruption only when the divisor is 0. In order to avoid occurrence of an exception interruption in a fixed point division by a computer, a value except for 0 may be used as the divisor.

Figure 7:
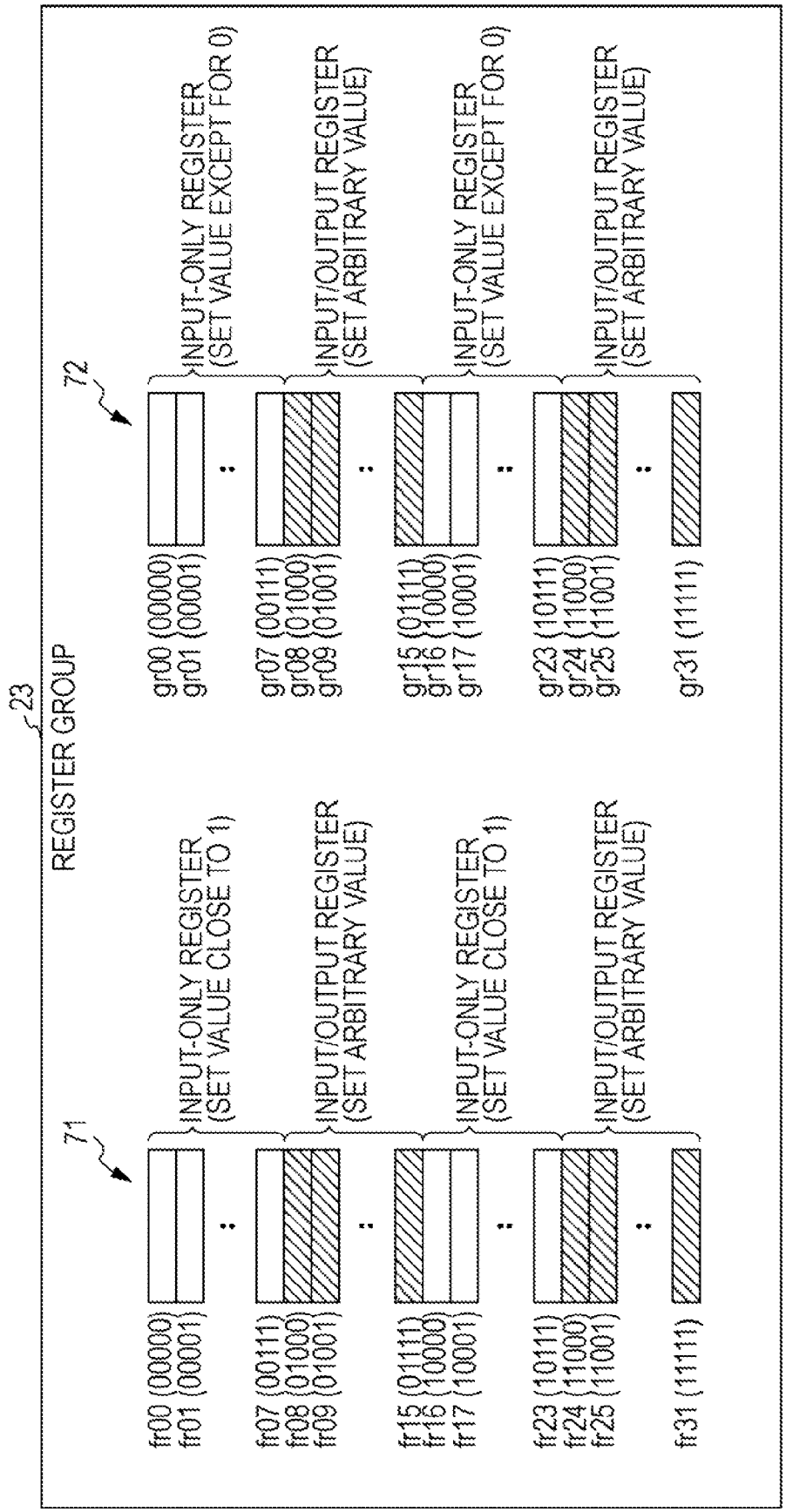
FIG. 7 is an explanatory diagram on input/output registers and input-only registers in a register group.

In order to avoid the occurrence of the exception, the computer 10 according to this second embodiment divides the registers into an input/output register and an input-only register and sets an initial value which does not involve exception processing for an input-only register, that is, an initial value which may not possibly cause an exception interruption. FIG. 7 is an explanatory diagram on input/output registers and input-only registers in the register group 23. The register group 23 has a floating point register set 71 which is used for a floating point arithmetic and a general-purpose register set 72 which is used for a fixed point arithmetic.

The floating point register set 71 has 32 registers. The register numbers of the 32 registers that the floating point register set 71 has are fr00 to fr31. The register numbers are "00000" to "11111" in a bit array. In the example in FIG. 7, among the register numbers in a bit array, a register having "0" at the higher second bit is set as an input-only register, and a register having "1" at the higher second bit is set as an input/output register. In FIG. 7, the registers with hatching are input/output registers while the register without hatching are input-only registers.

Therefore, among "00000" to "11111", the input-only registers are 16 of "00000" to "00111" and "10000" to "10111", and the input/output registers are 16 of "01000" to "01111" and "11000" to "11111".

Notating the register numbers "00000" to "11111" of the registers in the floating point register set 71 by fr00 to fr31, the input-only registers are fr00 to fr07 and fr16 to fr23, and the input/output registers are fr08 to fr15 and fr24 to fr31.

The computer 10 sets initial values in the floating point register set 71 by setting 1 or a value that is close to 1 to the input-only registers. The computer 10 can set an arbitrary value such as a random number to an initial value of an input/output register.

The general-purpose register set 72 has 32 registers. The register numbers of 32 registers that the general-purpose register set 72 has are gr00 to gr31. The register number gr00 to gr31 are "00000" to "11111" in a bit array. In the example in FIG. 7, among the register numbers in a bit array, a register having "0" at the higher second bit is set as an input-only register, and a register having "1" at the higher second bit is set as an input/output register. Like the floating point register set 71, registers with hatching are input/output registers while registers without hatching are input-only registers, in the general-purpose register set 72.

Therefore, among "00000" to "11111", the input-only registers are 16 of "00000" to "00111" and "10000" to "10111", and the input/output registers are 16 of "01000" to "01111" and "11000" to "11111".

Notating the register numbers "00000" to "11111" of the registers in the general-purpose register set 72 by gr00 to gr31, the input-only registers are gr00 to gr07 and gr16 to gr23, and the input/output registers are gr08 to gr15 and gr24 to gr31.

The computer 10 sets initial values in the general-purpose register set 72 by setting a value except for 0 to the input-only register. The computer 10 can set an arbitrary value such as a random number to an initial value of an input/output register.

Next, the generation of a test instruction array by the test instruction array generating portion 53 of the computer 10 will be described. An instruction included in a test instruction array has an op code indicating the type of the instruction, an input register, and an output register. The computer 10 sets a random value to a input register and an output register in a test instruction.

In order for the computer 10 to generate a test instruction, data for the input register and output register may be extracted from random data and be inserted to the instruction to be generated. Alternatively, there has been known a method which acquires an instruction having random values at an input register and an output register from one random data piece having an equal length to the instruction.

Figure 8:
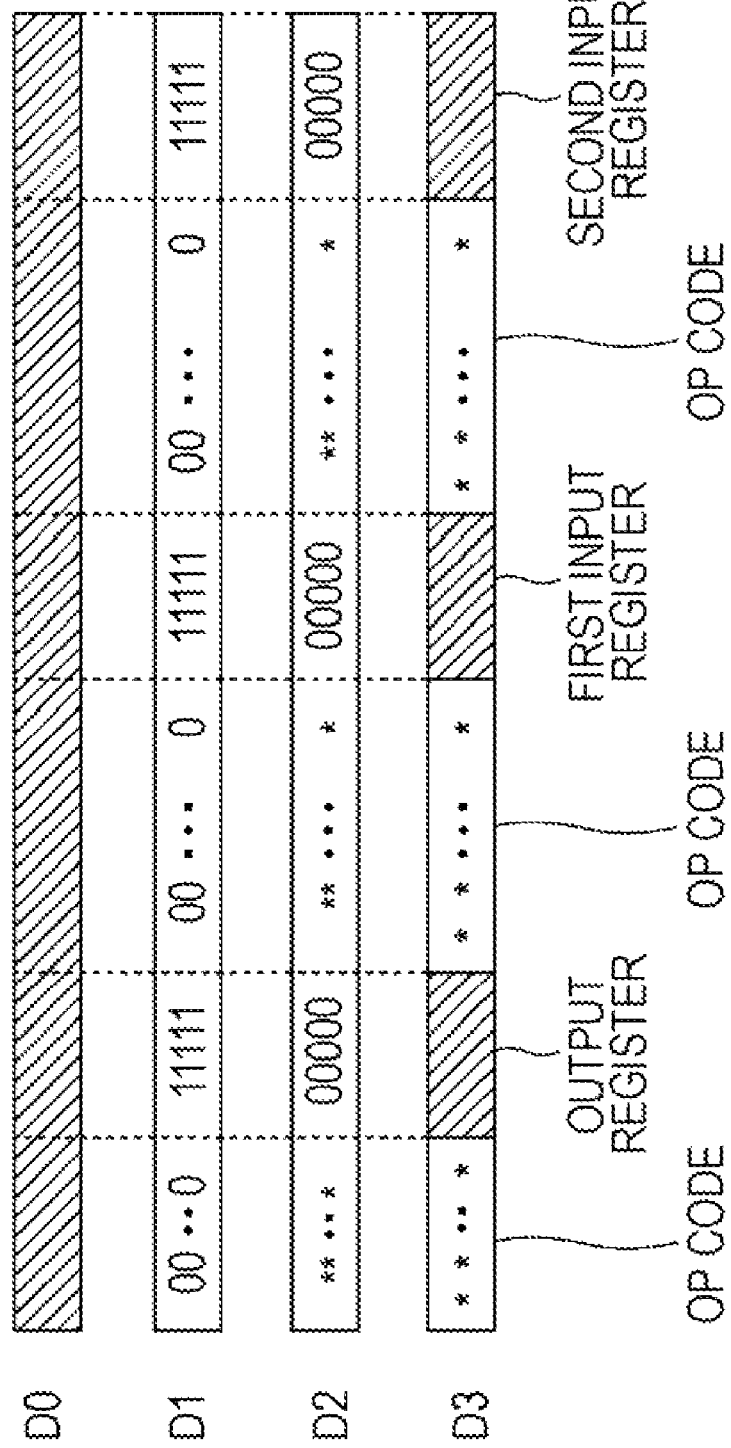
FIG. 8 illustrates the generation of a test instruction from one random data piece.

FIG. 8 illustrates the generation of a test instruction from one random data piece. In the example illustrated in FIG. 8, the computer 10 extracts random data D0 having the equal bit counts to those of the entire instruction to be generated from a pseudo-random array generated on the basis of a seed value for generating a test instruction. The computer 10 ANDs between random data D0 and AND data D1 and logical ORs with OR data D2 to acquire a test instruction D3.

The AND data D1 and the OR data D2 have the equal bit counts to those of the entire instruction. The AND data D1 and OR data D2 are defined for each instruction type. In the example in FIG. 8, the AND data D1 has all 0 as values of the bits in the range corresponding to the op code of the instructions. On the other hand, in FIG. 8, the OR data D2 has the values of the bits in the range corresponding to the op code of the instructions which are identical values to the op codes of the test instruction D3 to be generated.

Therefore, the computer 10 ANDs between the random data D0 and the AND data D1 and logical ORs between the AND result and the OR data D2 so that the values of the OR data D2 can be left as they are for the range corresponding to the op codes, irrespective of the values in the region corresponding to the random data D0.

In the example in FIG. 8, the AND data D1 have all 1 as the values of the bits in the range corresponding to the output registers and input registers in the test instruction D3 to be generated. On the other hand, the OR data D2 have all 0 as the values of the bits in the range corresponding to the output registers and input registers in the test instruction D3 to be generated.

Therefore, the computer 10 ANDs between the random data D0 and the AND data D1 and logical ORs between the AND result and the OR data D2 so that the values in the region corresponding to the random data D0 can be left as they are for the range corresponding to the output registers and input registers.

In this way, preparing the AND data D1 and the OR data D2 for each instruction type and OR and adjusting the part of corresponding to the op codes of the data D2 for the intended op codes allows the computer 10 to have the intended op codes and acquire the test instruction D3 having input registers and output registers set at random.

Setting all values of the input registers and output registers at random allows the computer 10 to designate any one register from the entire register set for each of the input registers and output registers. The computer 10 divides the input-only registers and input/output registers in accordance with their the higher second values of the register numbers, as described with reference to FIG. 7. Thus, the computer 10 defines the values in the range corresponding to the input registers and output registers in the AND data D1 and OR data D2, as illustrated in FIG. 9.

Figures 9, 10:
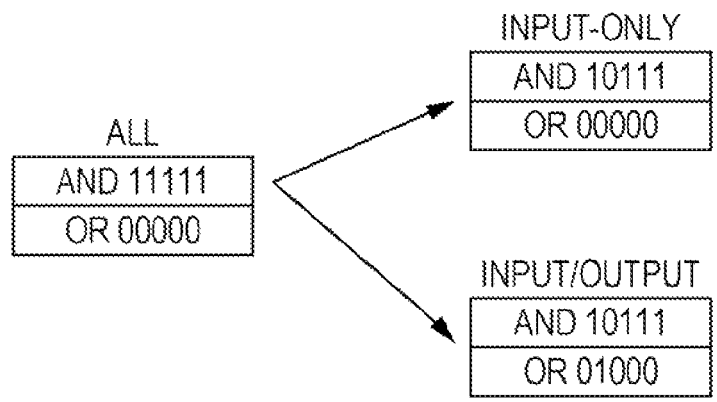
FIG. 9 is an explanatory diagram regarding control over register numbers.
FIG. 10 is an explanatory diagram of a concrete example of the generation of an fdiv instruction.

FIG. 9 is an explanatory diagram regarding control over register numbers. The values in the range corresponding to the input registers and output registers keep the values in the range corresponding to the input registers and output registers of the random data D0 if the bits of the AND data D1 are all 1, and the bits of the OR data D2 are all 0. Thus, the computer 10 can select a register from the entire register set.

On the other hand, the higher second bit of the register numbers of the test instruction D3 to be generated from the values in the range corresponding to the input registers and output registers are always 0 if the second bit of the AND data D1 is 0, the other bits are 1, and the bits of the OR data D2 are all 0. As a result, setting the values corresponding to the input/output registers of the AND data D1 and OR data D2 as described above allows the computer 10 to select any one of the input-only registers.

The higher second bit of the register numbers of the test instruction D3 to be generated from the values in the range corresponding to the input registers and output registers are always 0 if the second bit of the OR data D2 is 1, and the other bits are 0. As a result, the computer 10 can select any one of the input/output registers. Regarding the range corresponding to input register and/or output register, the second bit of the AND data D1 may be either 0 or 1 if the higher second bit of the OR data D2 is 1.

Regarding the generation of a test instruction, the generation of an fdiv instruction and an fand instruction will be described, for example. FIG. 10 is an explanatory diagram of a concrete example of the generation of an fdiv instruction. An fdiv instruction which is a floating point division causes an exception interruption with some input values. Thus, the computer 10 selects both of the first input register and second input register of an fdiv instruction from the input-only registers. The computer 10 further selects an output register from the input/output registers.

In the example illustrated in FIG. 10, the random number in the range corresponding to the first input register is "11011" in the random data D0 (FIG. 10, "RANDOM NUMBER"). ANDing between the value and the value "10111" of the AND data D1 results in "10011". Logical ORing between the value resulting from the AND and the value "00000" of the OR data D2 results in "10011". The value corresponds to the register fr19 of the floating point register set 71.

In the same manner, in the example illustrated in FIG. 10, the random number in the range corresponding to the second input register is "01101" in the random data D0. ANDing between the value and the value "10111" of the AND data D1 results in "00101". Logical ORing between the value resulting from the AND and the value "00000" of the OR data D2 results in "00101". The value corresponds to the register fr05 of the floating point register set 71.

In the example in FIG. 10, the random number in the range corresponding to the output register is "00110" in the random data D0. ANDing between the value and the value "10111" of the AND data D1 results in "00110". Logical ORing between the value resulting from the AND and the value "01000" of the OR data D2 results in "01110". The value corresponds to the register fr14 of the floating point register set 71.

Thus, in the example illustrated in FIG. 10, the instruction "fdiv, fr19, fr05, fr14" is generated. As already described, the register numbers of the input-only registers are fr00 to fr07 and fr16 to fr23, and the register numbers of the input/output registers are fr08 to fr15 and fr24 to fr31. The input registers fr19 and fr05 of the instruction "fdiv, fr19, fr05, fr14" are input-only registers, and the output register fr14 is an input/output register.

FIG. 11 is an explanatory diagram of a concrete example of the generation of an fand instruction. An fand instruction which is a floating point AND does not cause exception interruptions irrespective of input values. Thus, the computer 10 can select both of the first input register and second input register of an fand instruction from the entire register set. The computer 10 further selects an output register from the input/output registers.

In the example illustrated in FIG. 11, the random number in the range corresponding to the first input register is "10011" in the random data D0 (FIG. 11 "RANDOM NUMBER"). ANDing between the value and the value "11111" of the AND data D1 results in "10011". Logical ORing between the value resulting from the AND and the value "00000" of the OR data D2 results in "10011". The value corresponds to the register number fr19 of the floating point register set 71.

In the same manner, in the example illustrated in FIG. 11, the random number in the range corresponding to the second input register is "11011" in the random data D0. ANDing between the value and the value "11111" of the AND data D1 results in "11011". Logical ORing between the value resulting from the AND and the value "00000" of the OR data D2 results in "11011". The value corresponds to the register number fr27 of the floating point register set 71.

In the example in FIG. 11, the random number of the range corresponding to the output register is "00111" in the random data D0. ANDing between the value and the value "10111" of the AND data D1 is "00111". Logical ORing between the value resulting from the AND and the value "01000" of the OR data D2 results in "01111". The value corresponds to the register number fr15 of the floating point register set 71.

Thus, in the example illustrated in FIG. 11, the instruction "fand, fr19, fr27, fr15" is generated. As already described, the register numbers of the input-only registers are fr00 to fr07 and fr16 to fr23, and the register numbers of the input/output registers are fr08 to fr15 and fr24 to fr31. The input register fr19 of the instruction "fand, fr19, fr27, fr15" is an input-only register. The input register fr27 is an input/output register. In the same manner, the output register fr14 is an input/output register.

In this way, in order to generate a test instruction by using the AND with AND data and the logical OR between the AND result and OR data for one random data piece, setting values in the reregister designated part in the AND data and OR data appropriately allows easy setting of designated input registers and output registers of the instruction.

The computer 10 executes a high load test by presetting designated input registers and output registers and sequentially submitting the generated instructions to the pipeline to acquire a high load state.

The computer 10 executes a conflict test by presetting designated input registers and output registers and using a test instruction array defined to cause a conflict between instructions.

FIG. 12 is an explanatory diagram on a conflict. The instruction op21 illustrated in FIG. 12 has an op code fadd indicating a floating point addition, a first input register fr10, a second input register fr12, and an output register fr14. The instruction op22 following the instruction op21 has an op code fsubd indicating a floating point subtraction, a first input register fr14, a second input register fr16, and an output register fr18.

Here, the output register fr14 of the instruction op21 is used as an input register of the subsequent instruction op22. In this way, the term "conflict" refers to that the register assigned to an output register of one instruction is used as an input register of the subsequent instruction. The state is called a conflict state, and the target register is called a conflict register.

Normally, a computer serially submits an instruction array without a conflict state to the pipeline of its CPU. However, if the instruction array has a conflict state, the computer suspends the processing on the subsequent instruction having the conflict state until the instruction causing the conflict ends. The computer keeps submitting subsequent instructions without the conflict state to the pipeline even during the suspension of the instruction with the conflict state. For that, the computer performs complicated control for assuring the sequence relationship between instructions. In order to test the state of the control over a conflict, the computer executes a test instruction array including various conflict states.

Figure 13:
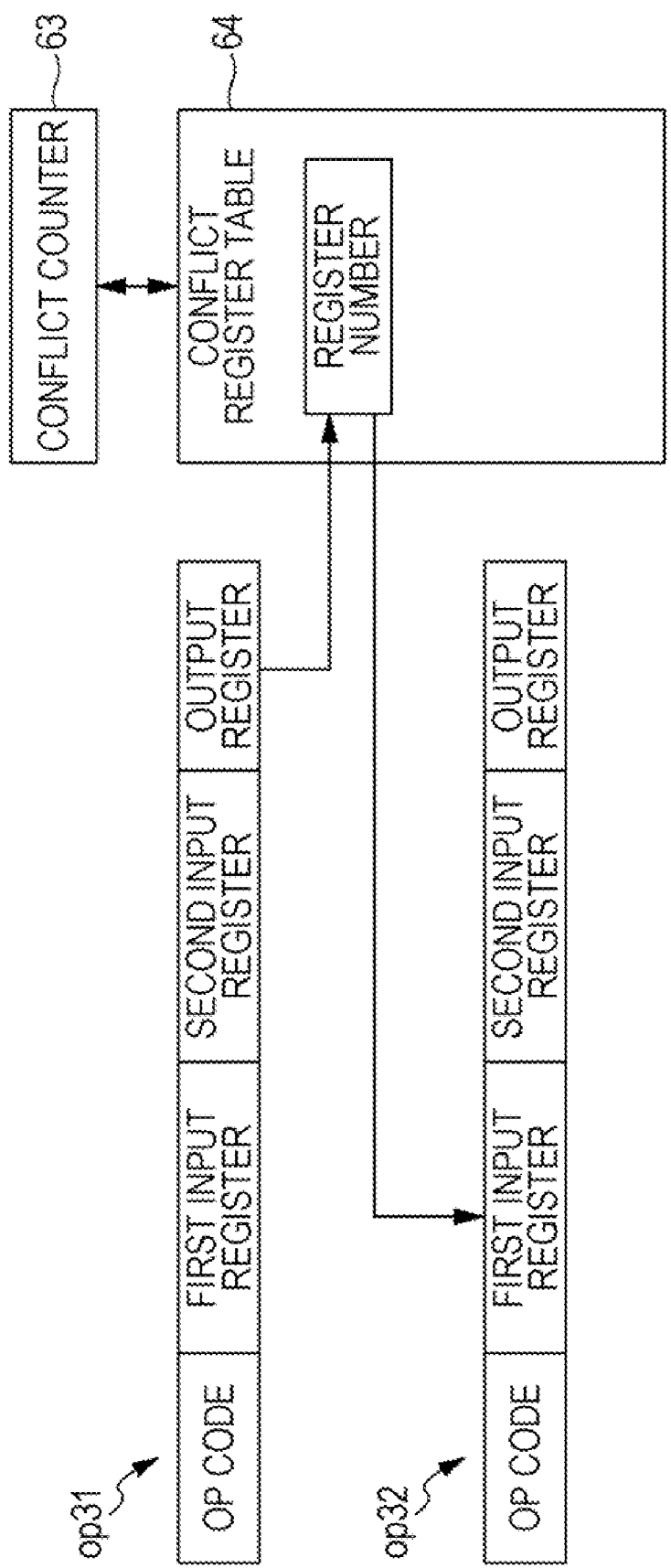
FIG. 13 is an explanatory diagram on the setting of a conflict in a test instruction array.

FIG. 13 is an explanatory diagram on the setting of a conflict in the test instruction array. Each of the instruction op31 and instruction op32 illustrated in FIG. 13 has an op code, a first input register, a second input register, and an output register. The computer 10 sets random values to the input registers and output registers of the instruction op31 and instruction op32 included in the test instruction array.

The conflict register table 64 is a register table with which a conflict register is to be registered. The conflict counter 63 is a counter for managing the number of register numbers conflict registered with the register table 64.

The computer 10 registers the register numbers of the output registers of the instruction op31 which is the preceding instruction with the conflict register table 64. The computer 10 further rewrites the register number of an input register of the subsequent instruction op32 by the register number of an output register of the preceding instruction, which is read from the conflict register table 64.

Whether an output register of another instruction can be used as an input register or not may be preset for each instruction for each input if the instruction uses a plurality of inputs, and the computer 10 holds the setting data.

If the register number registered with the conflict register table 64 is used as an input register of another instruction, the computer 10 deletes the used register number from the conflict register table 64.

If a register number is registered with or is deleted from the conflict register table 64, the computer 10 rewrites the value of the conflict counter 63. If the conflict counter 63 has a maximum, that is, if the number of register numbers registered with the conflict register table 64 reaches an upper limit, the computer 10 deletes the oldest value from the conflict register table 64.

In this way, the computer 10 registers an output register of an instruction with the conflict register table 64 and uses the output register registered with the conflict register table 64 as an input register of the subsequent instruction. Thus, a conflict state can be incorporated into the test instruction array. Another instruction may exist between the instruction having the register number of an output register registered with the conflict register table 64 and the instruction using the registered register number as an input register.

Figures 14, 15:
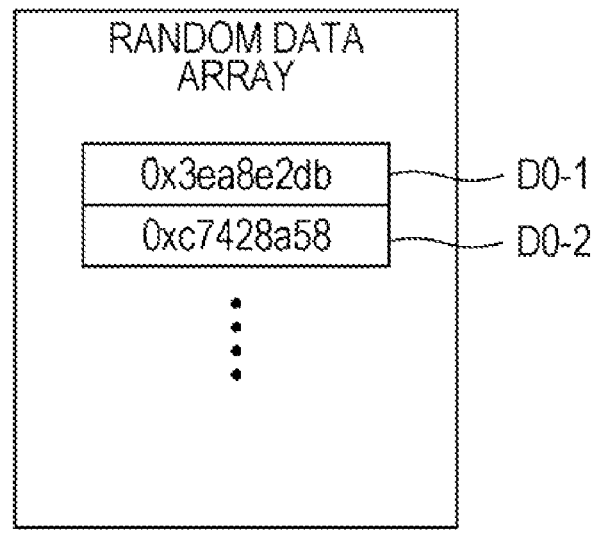
FIG. 14 illustrates a concrete example of random data generated by a random data generating portion.
FIG. 15 is a concrete example of an instruction definition structure table stored in the storage unit.

Next, a concrete example of the test instruction array generation by the instruction generating unit 41 will be described. FIG. 14 illustrates a concrete example of random data generated by the random data generating portion 52. The random data generating portion 52 generates a pseudo-random array by setting a seed value as an initial value. The random data generating portion 52 extracts the generated pseudo-random array for each bit count of the test instructions to generate the number of random data pieces which is equal to or higher than the number of instructions included in the test instruction array. In the example in FIG. 14, the value of the first random data D0-1 is "0x3ea8e2 db". 0x of the value indicates a hexadecimal notation, and 3ea8e2 db is the data body. The second random data D0-2 is "0xc7428a58".

FIG. 15 is a concrete example of an instruction definition structure table 62 stored in the storage unit 43. The instruction definition structure table 62 holds an instruction definition structure defined for each type of instruction. Each of the instruction definition structures has an instruction type, AND data, OR data, and a conflict flag.

Each of the AND data and OR data is 4-byte data. The test instruction array generating portion 53 ANDs between 4-byte random data and AND data and further logical ORs between the AND result and OR data to generate the instruction defined in the instruction type. In FIG. 15, AND data and OR data are notated by hexadecimal numbers.

The conflict flag is 1-bytedata and indicates whether an input register and output register of the instruction are available for setting a conflict or not. The instruction definition structure table 62 uses 4 bits of the conflict flag as valid bits. In FIG. 15, the conflict flag is notated by a binary number.

The instruction definition structure table 62 indicates whether an output register is used as a conflict register or not at the higher first bit in the illustrated range of the conflict flag. If some register is designated as the output registers of an instruction, that is, if the output of an instruction is to be written to some register, the higher first bit of the conflict flag indicates 1. If the output of an instruction is not to be written to some register, the higher first bit of the conflict flag indicates 0.

The instruction definition structure table 62 further indicates whether three input registers are available as conflict registers or not at the higher second bit to fourth bit of the conflict flag. Each of the bits corresponds to one of the three inputs and indicates 1 if the corresponding input register is used by an instruction and is available as a conflict register and indicates 0 if the corresponding input register is not used by an instruction and/or is not available as a conflict register. The input register which is not available as a conflict register may be, for example, an input register which may possibly cause exception processing with some value of the register.

In FIG. 15, the instruction definition structure table 62 defines "0x1e07c01f" as AND data of a for instruction indicating a floating point logical OR, "0xa1b00f80" as OR data, and "1011" as a conflict flag. The instruction definition structure table 62 further defines "0x1e03c00f" as AND data of a fadd instruction, "0xa1a00840" as OR data, and "1000" as a conflict flag.

In the same manner, the instruction definition structure table 62 defines "0x1e03c00f" as AND data of fsubd instruction, "0xa1a008c0" as OR data, and "1000" as a conflict flag.

The instruction definition structure table 62 further defines "0x1e03c00f" as AND data of an fmuld instruction indicating a floating point integration, "0xa1a00940" as OR data, and "1000" as a conflict flag.

Figure 16:
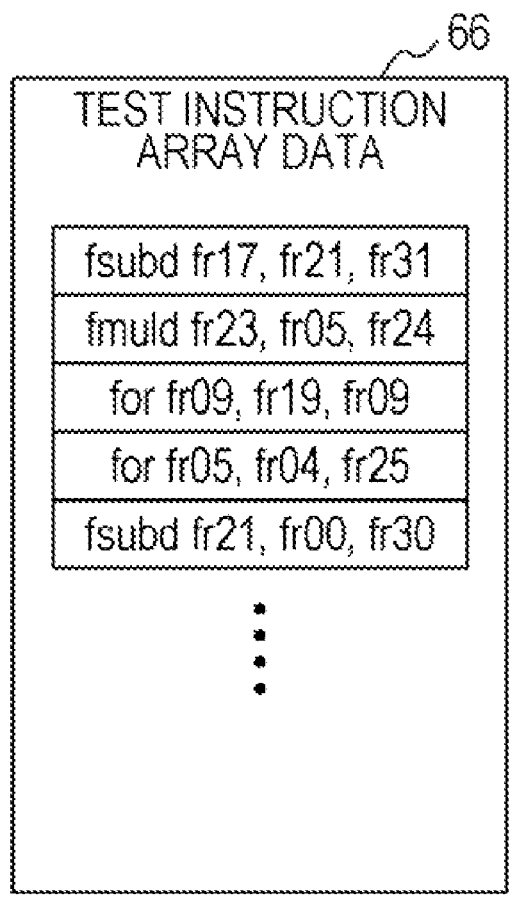
FIG. 16 illustrates a concrete example of test instruction array data generated by the test instruction array generating portion.

FIG. 16 illustrates a concrete example of test instruction array data 66 generated by the test instruction array generating portion 53. The test instruction array data 66 illustrated in FIG. 16 is an example of an instruction array generated from random data by the test instruction array generating portion 53 by using the instruction definition structure table 62.

From the test instruction array data 66, the first instruction to the fifth instruction are given, for example. The first instruction is "fsubd fr17, fr21, fr31". The fr17 which is the first input register of the fsubd instruction and fr21 which is the second input register are input-only registers. The fr31 which is an output register of the subd instruction is an input/output register.

The second instruction is "fmuld fr23, fr05, fr24". The fr23 which is the first input register of the fmuld instruction and the fr05 which is the second input register are input-only registers. The fr24 which is an output register of the fmuld instruction is an input/output register.

The third instruction is "for fr09, fr19, fr09". The fr09 which is the first input register of the for instruction is an input/output register, and the fr19 which is the second input register is an input-only register. The fr09 which is an output register of the for instruction is an input/output register.

The 4th instruction is "for fr05, fr04, fr25". The fr05 which is the first input register of the for instruction and the fr04 which is the second input register are input-only registers. The fr25 which is an output register of the for instruction is an input/output register.

The fifth instruction is "fsubd fr21, fr00, fr30". The fr21 which is the first input register of the fsubd instruction and the fr00 which is the second input register are input-only registers. The fr30 which is the output register of the fsubd instruction is an input/output register.

In this way, the computer 10 generates test instruction array data 66 designating an input/output register as an output register of an instruction and designating an input-only register as an input register of a specific type of instruction.

The computer 10 may store and use the test instruction array data 66 in the storage unit 43 for a high load state test. The computer 10 replaces an input register of a test instruction array, updates the test instruction array data 66 and stores it in the storage unit 43 in order to set a conflict in a test instruction array.

Figure 17:
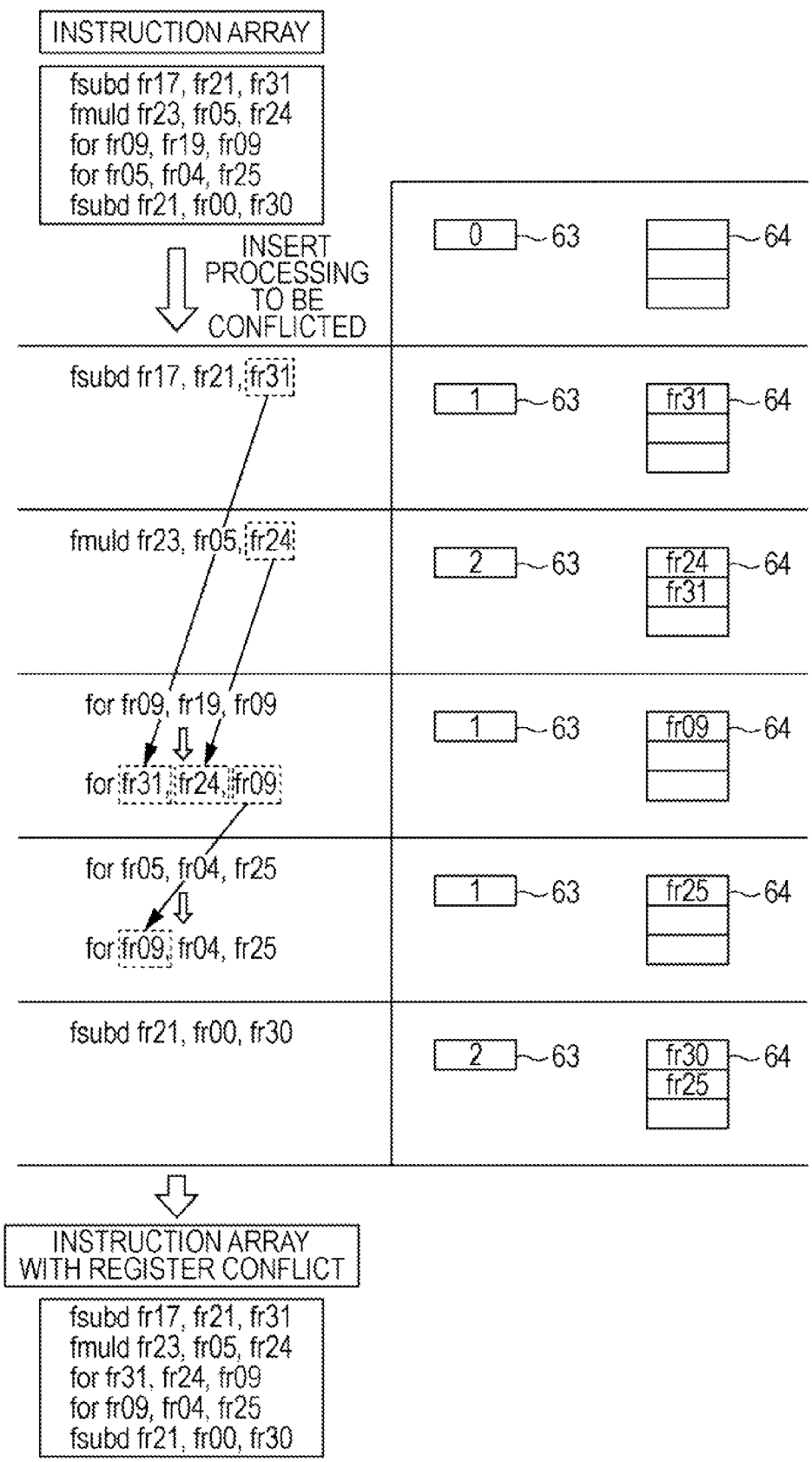
FIG. 17 is a concrete example of conflict setting.

FIG. 17 is a concrete example of conflict setting. In the initial state, the conflict register table 64 does not store a register number, and the value of the conflict counter 63 is 0. The test instruction array generating portion 53 of the computer 10 first refers to the conflict flag of the instruction definition structure table 62 regarding the first instruction and determines whether the output register corresponding to the register number of the first instruction is available for a conflict or not. The first instruction is "fsubd fr17, fr21, fr31", and the output register is thus available for a conflict. For that, the test instruction array generating portion 53 registers the register number fr31 of the output register of the first instruction with the conflict register table 64 and changes the value of the conflict counter 63 to 1.

The second instruction is "fmuld fr23, fr05, fr24". The conflict flag on the instruction definition structure table 62 indicates that an output register of the fmuld instruction is only available for a conflict. For that, the test instruction array generating portion 53 registers the output register fr24 of the second instruction with the conflict register table 64 and changes the value of the conflict counter 63 to 2.

The third instruction is "for fr09, fr19, fr09". The conflict flag on the instruction definition structure table 62 indicates that an output register and input register of the for instruction are both available for a conflict. For that, the test instruction array generating portion 53 reads the register numbers fr31 and fr24 from the conflict register table 64 and replaces them by two input register numbers of the third instruction. In this case, the test instruction array generating portion 53 deletes the fr31 and fr24 used in the for instruction from the conflict register table 64 and decrements the value of the conflict counter 63 by 2 to 0. The test instruction array generating portion 53 further registers the output register fr09 of the third instruction with the conflict register table 64 and changes the value of the conflict counter 63 to 1.

The 4th instruction is "for fr05, fr04, fr25". The conflict flag on the instruction definition structure table 62 indicates that an output register and input register of the for instruction are both available for a conflict. For that, the test instruction array generating portion 53 reads the register number fr09 from the conflict register table 64 and replaces one of two input register numbers of the fourth instruction by the register number fr09. The test instruction array generating portion 53 deletes the used register number fr09 from the conflict register table 64 and decrements the value of the conflict counter 63 by 1 to 0. The test instruction array generating portion 53 further registers the output register number fr25 of the fourth instruction with the conflict register table 64 and changes the value of the conflict counter 63 to 1.

The fifth instruction is "fsubd fr21, fr00, fr30". The conflict flag on the instruction definition structure table 62 indicates that an output register of the fsubd instruction is only available for a conflict. For that, the test instruction array generating portion 53 registers the register number fr30 of the output register of the fifth instruction with the conflict register table 64 and changes the value of the conflict counter 63 to 2.

These replacements result in the first instruction "fsubd fr17, fr21, fr31", the second instruction "fmuld fr23, fr05, fr24", the third instruction "for fr31, fr24, fr09", the fourth instruction "for fr09, fr04, fr25", and the fifth instruction "fsubd fr21, fr00, fr30". The first, second, and fifth instruction are not different from those before the replacements, but the third instruction and fourth instruction are changed to cause a conflict.

Figure 18:
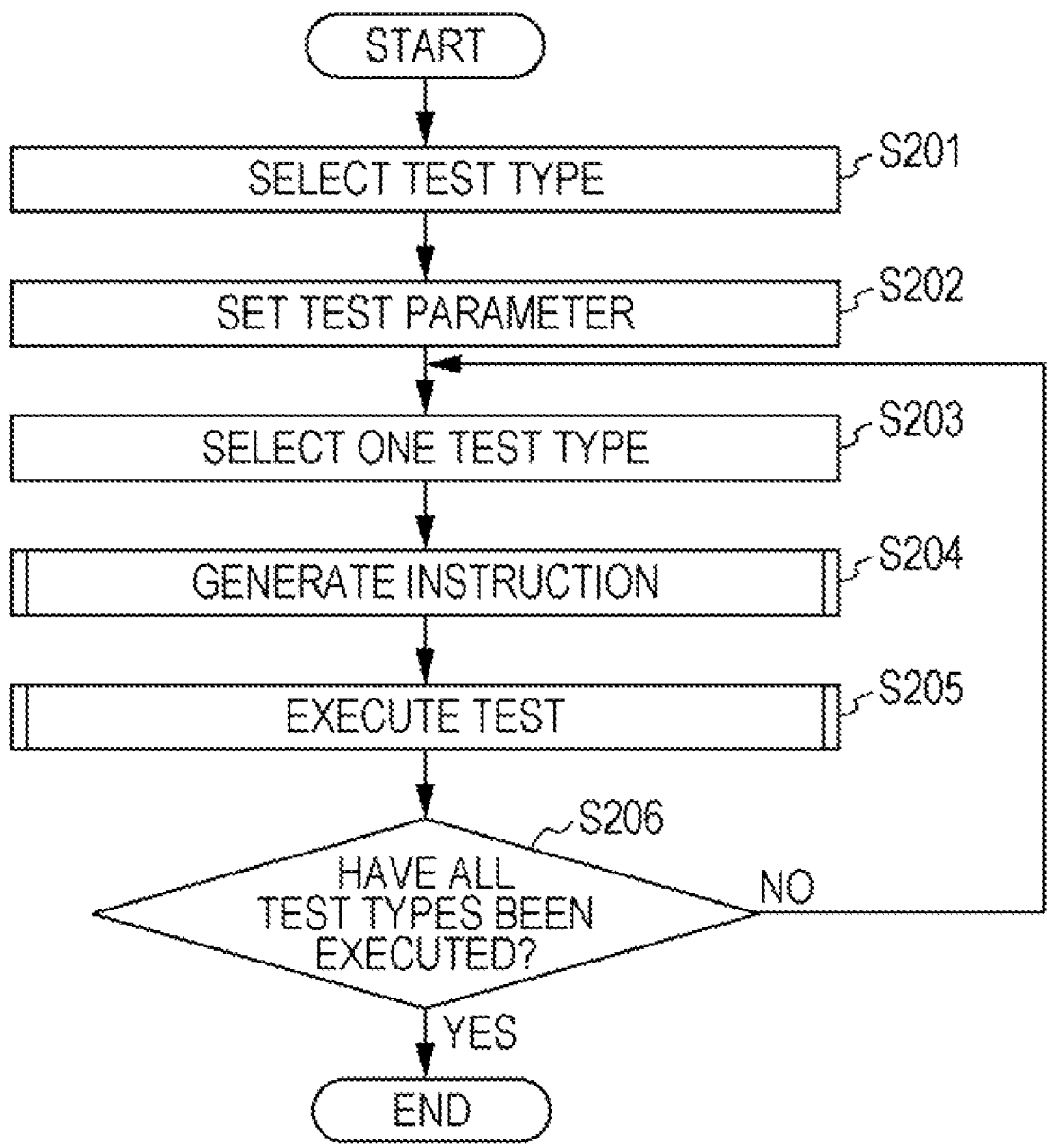
FIG. 18 is a flowchart describing a processing operation by a computer.

Next, processing operations by the computer 10 will be described. FIG. 18 is a flowchart describing a processing operation by the computer 10 when a test program 31 is executed. The computer 10 executing the test program 31 first selects the test type (S201). The test type indicates under which condition the operation test is to be performed. For example, the test types may includes a fixed point arithmetic test, a floating point arithmetic test, a test including a mix of a fixed point arithmetic and a floating point arithmetic, a test including a mix of arithmetic processing and access processing, and a test including a mix of arithmetic processing and branch processing. The test type may be selected on the basis of a user input, for example.

After the test type is selected, the computer 10 sets a test parameter (S202). The test parameter includes the number of instructions is a test instruction array and whether a conflict is to be set or not. The computer 10 further can designate a seed value as the test parameter. If a seed value is designated as the test parameter, the computer 10 may generate register initial value data from the seed value.

After the test parameter is set, the computer 10 is one of the test types to be executed (S203), and the instruction generating unit 41 performs instruction generation processing (S204). The computer 10 uses the generated instruction array, and the test executing unit 42 performs test execution processing (S205).

After the test execution processing, the computer 10 determines whether all of the selected test types have been tested or not (S206). If unprocessed test types remain (No in S206), the computer 10 returns to S203. If all of the selected test types have been tested (Yes in S206), the computer 10 ends the processing.

Figure 19:
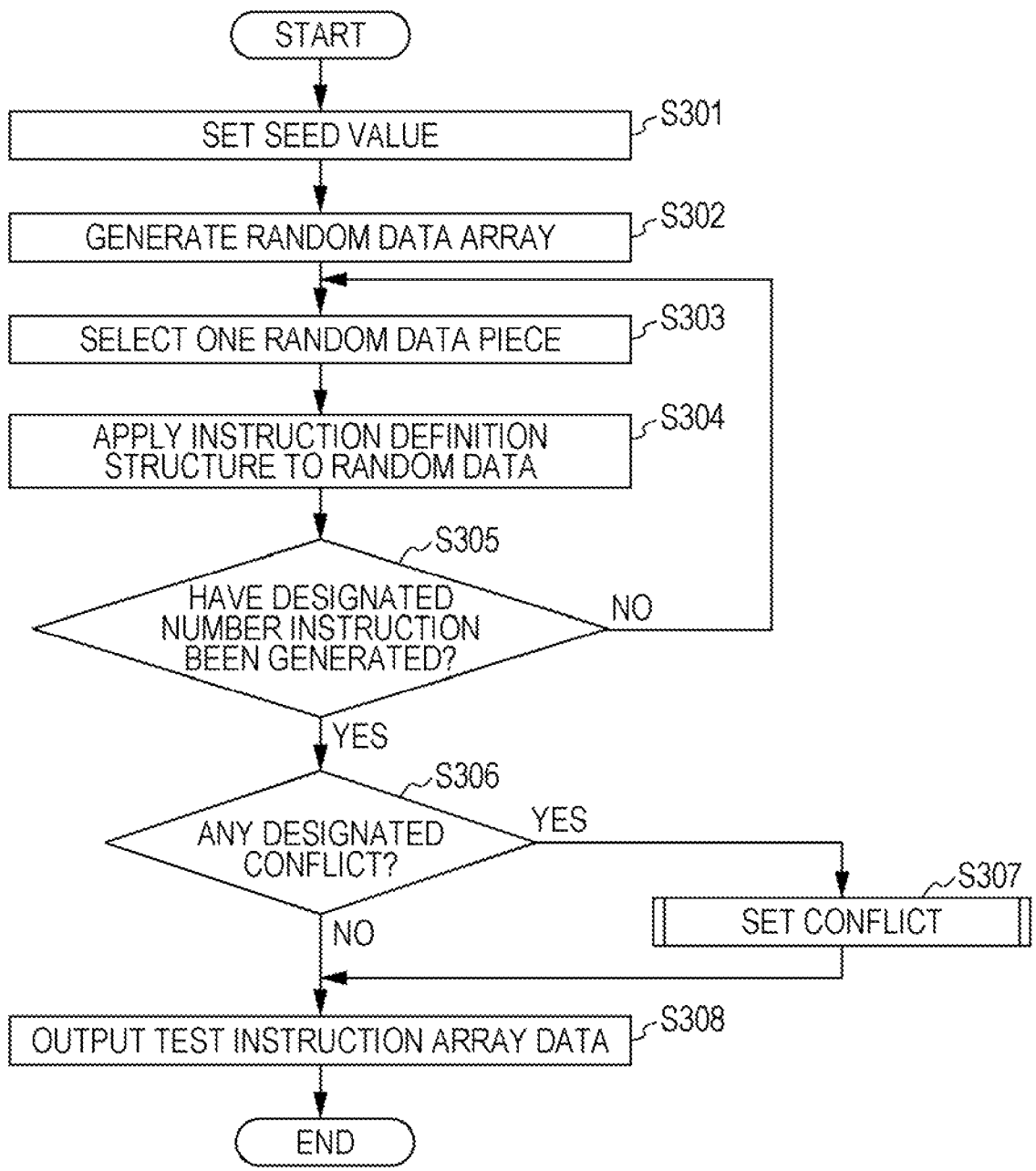
FIG. 19 is a flowchart describing details of the instruction generation processing described in FIG. 18.

FIG. 19 is a flowchart describing details of the instruction generation processing described in FIG. 18. In the instruction generating unit 41, the first seed value setting portion 51 sets a seed value (S301). If a seed value is designated as a test parameter, the seed value setting portion 51 uses the designated seed value. If a seed value is not designated, the seed value setting portion 51 newly generates and sets a seed value.

After a seed value is setting, the instruction generating unit 41 uses the seed value set by the seed value setting portion 51 to cause the random data generating portion 52 to generate a random data array (S302). The random data generating portion 52 sets the seed value as the initial value to generate a pseudo-random array and sequentially extracts random data having an equal length to that of the instruction length from the pseudo-random array to generate a random data array.

When a random data array is generated, the instruction generating unit 41 selects one random data piece (S303), applies an instruction definition structure to the random data piece and thus generates a test instruction (S304). If the number of generated test instructions is lower than the designated number of test parameters (No in S305), the instruction generating unit 41 returns to the random data selection (S303).

If the number of generated test instructions reaches the designated number of test parameters (Yes in S305), the instruction generating unit 41 determines whether the test parameter designates a conflict or not (S306). If a conflict is not designated (No in S306) as a result, the instruction generating unit 41 outputs the generated test instruction as test instruction array data (S308) and ends the processing. If a conflict is designated on the other hand (Yes in S306), the instruction generating unit 41 performs conflict setting on the generated test instruction (S307), outputs it as test instruction array data (S308), and ends the processing.

Figure 20:
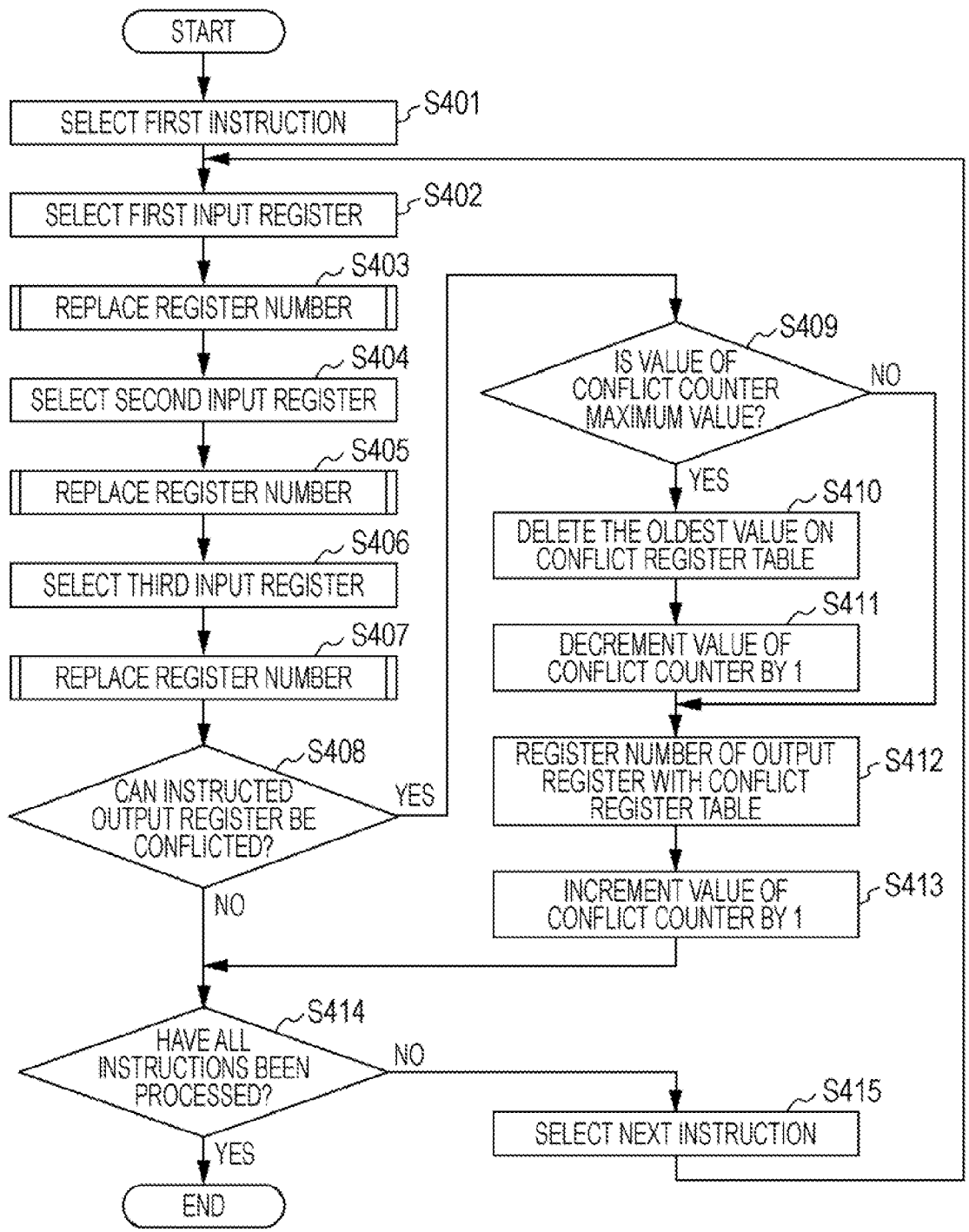
FIG. 20 is a flowchart describing details of the conflict setting processing illustrated in FIG. 19.

FIG. 20 is a flowchart describing details of the conflict setting processing illustrated in FIG. 19. If the conflict setting processing starts, the test instruction array generating portion 53 first selects the first instruction of the generated test instruction array (S401).

After selecting the instruction, the test instruction array generating portion 53 selects the first input register of the instruction (S402) and performs register number replacement processing (S403). After that, the test instruction array generating portion 53 selects the second input register of the instruction (S404) and performs the register number replacement processing (S405). The test instruction array generating portion 53 then selects the third input register of the instruction (S406) and performs the register number replacement processing (S407).

After replacing the input register number, the test instruction array generating portion 53 determines whether the output register of the instruction can be the target of a conflict or not (S408). If the output register can be the conflict target as a result of the determination (Yes in S408), the test instruction array generating portion 53 determines whether the value of the conflict counter is equal to a maximum value or not (S409).

If the value of the conflict counter 63 is equal to the maximum value (Yes in S409), the test instruction array generating portion 53 deletes the oldest value from the conflict register table 64 (S410) and decrements the value of the conflict counter 63 by 1 (S411).

After the decrement of the value of the conflict counter 63 or if the value of the conflict counter is not equal to the maximum value (No in S409), the test instruction array generating portion 53 registers the register number of the output register of the instruction with the conflict register table 64 (S412) and increments the value of the conflict counter by 1 (S413).

After the increment of the value of the conflict counter or if the output register of the instruction may not be the conflict target (No in S408), the test instruction array generating portion 53 determines whether all instructions of the test instruction array have been processed or not (S414). If some unprocessed instruction remains as a result (No in S414), the test instruction array generating portion 53 selects the next instruction (S415) and returns to the selection of the first input register (S402). If all instructions have been processed (Yes in S414), the test instruction array generating portion 53 ends the conflict setting processing.

Figure 21:
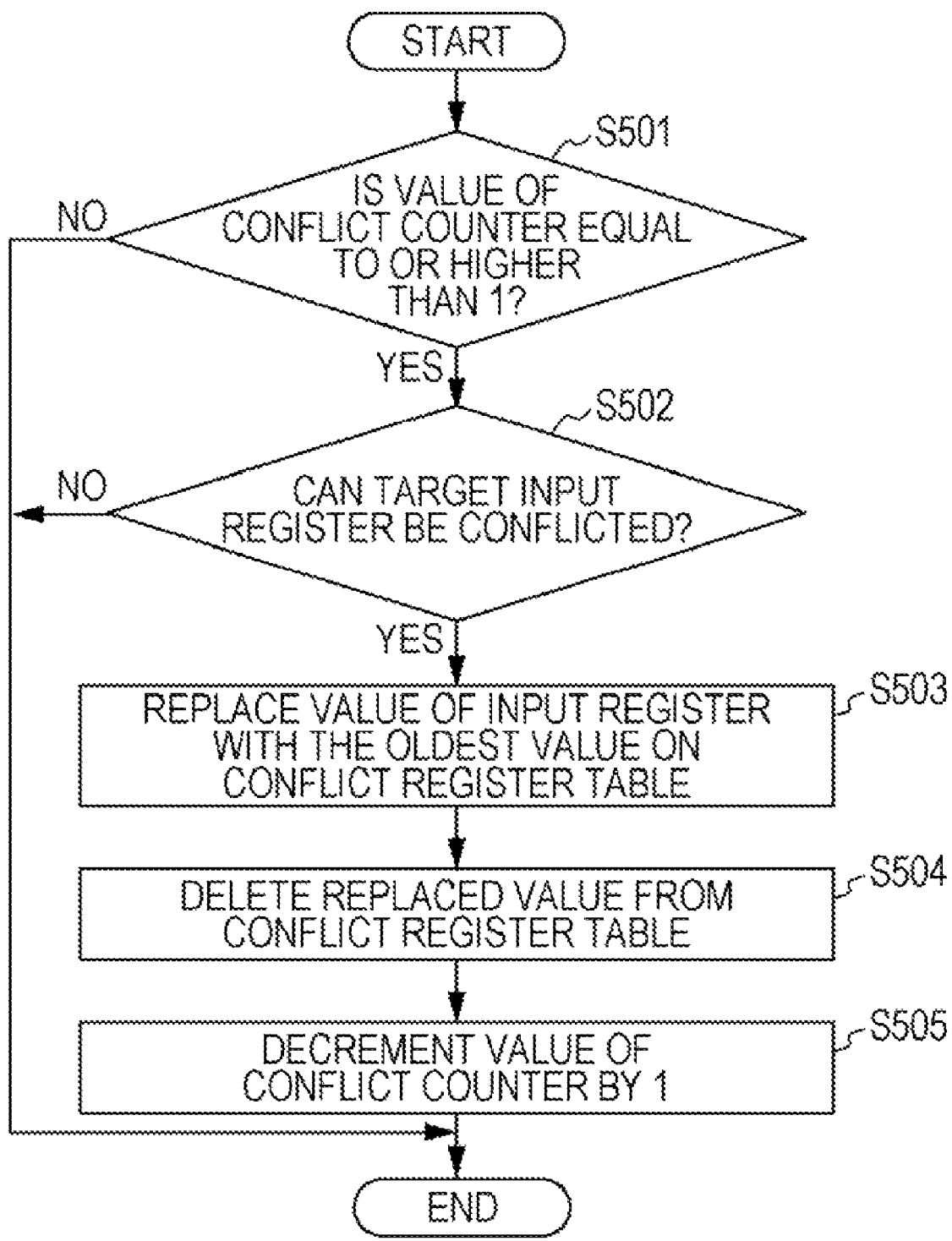
FIG. 21 is a flowchart describing details of the register number replacement processing described in FIG. 20.

FIG. 21 is a flowchart describing details of the register number replacement processing described in FIG. 20. If the register number replacement processing starts, the test instruction array generating portion 53 first determines whether the value of the conflict counter 63 is equal to or higher than 1 or not (S501).

If the value of the conflict counter 63 is equal to or higher than 1 (Yes in S501), the test instruction array generating portion 53 refers to a conflict flag on the instruction definition structure table 62 and determines whether the target input register can be used as a conflict target or not (S502).

If the target input register can be used as the conflict target as a result of the determination (Yes in S502), the test instruction array generating portion 53 replaces the target input register by the oldest register number on the conflict register table 64 (S503).

After replacing the target input register, the test instruction array generating portion 53 deletes the register number used for the replacement from the conflict register table 64 (S504) and decrements the value of the conflict counter 63 by 1 (S505).

After the decrement of the value of the conflict counter 63 by 1, the test instruction array generating portion 53 ends the register number replacement processing. If the value of the conflict counter 63 is 0 (No in S501) and if the target input register may not be used as the conflict target (No in S502), the test instruction array generating portion 53 also ends the register number replacement processing.

Figure 22:
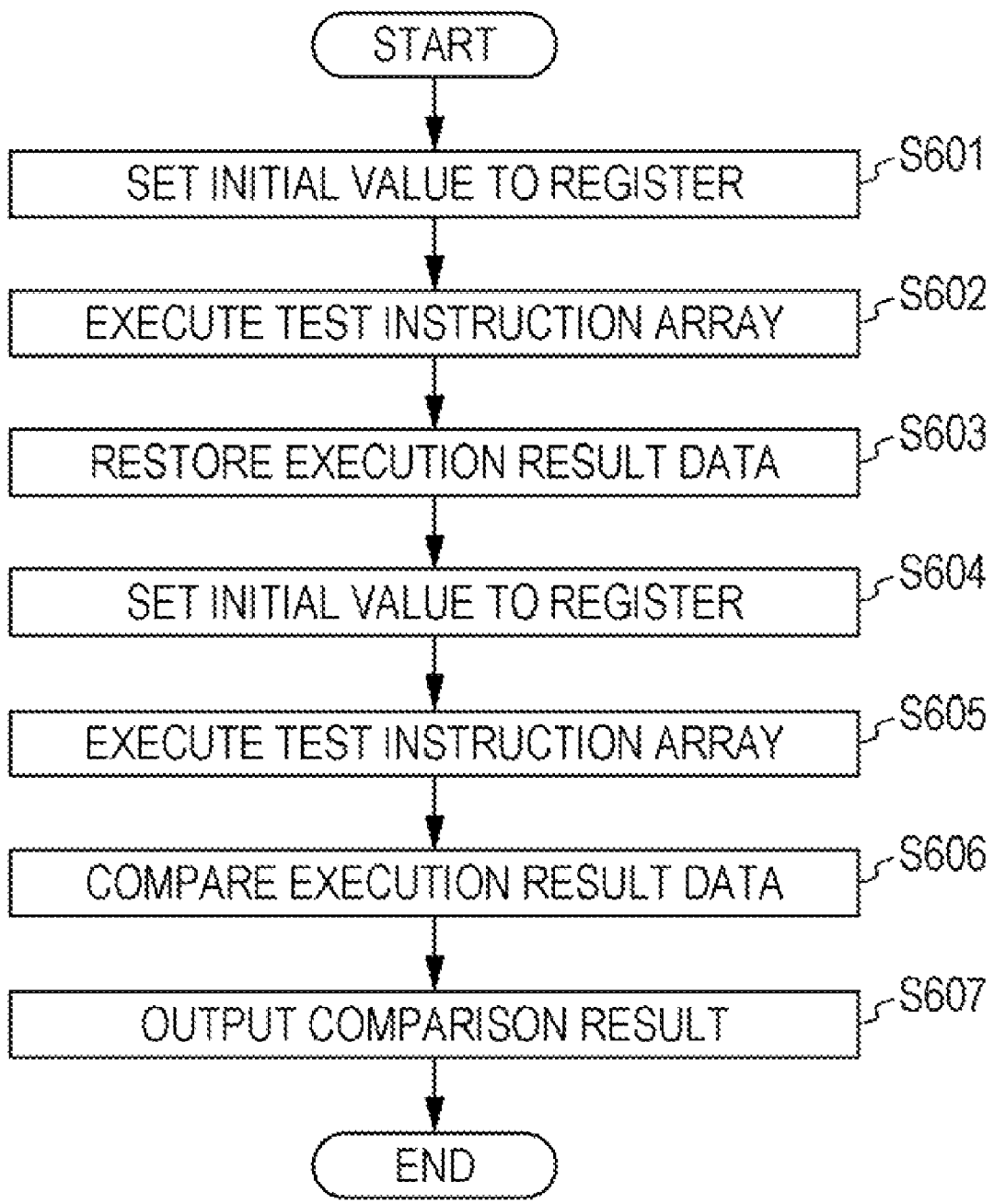
FIG. 22 is a flowchart describing details of the test execution processing described in FIG. 18.

FIG. 22 is a flowchart describing details of the test execution processing described in FIG. 18. If the test execution processing starts, the initial value setting portion 54 within the test executing unit 42 sets an initial value to the register (S601). If the storage unit 43 stores register initial value data 65, the initial value setting portion 54 reads and uses the register initial value data 65. If the storage unit 43 does not store register initial value data 65 on the other hand, the initial value setting portion 54 generates the register initial value data 65 on the basis of the seed value data 61 and stores it in the storage unit 43. As already described, the register initial value data 65 has a value that is close to 1 as the value to be set to an input-only register of floating point registers and a value except for 0 as the value to be set to an input-only register of the general-purpose registers.

After setting the initial value to the register, the instruction array executing portion 55 reads and executes the test instruction array data 66 from the storage unit 43 (S602). After the execution of the test instruction array, the execution result saving portion 56 stores the execution result to the storage unit 43 as execution result data 67 (S603).

After the execution result data 67 stored in the storage unit 43, the initial value setting portion 54 sets the initial value to the register again (S604). After the initial value is set to the register, the instruction array executing portion 55 reads and executes the test instruction array data 66 from the storage unit 43 (S605).

After the second execution of the instruction array, the result comparing portion 57 compares and evaluates the first execution result and the second execution result stored in the storage unit 43 as the execution result data 67 (S606), outputs the comparison result (S607), and ends the processing.

As described above, according to the second embodiment, a computer is caused to execute a test program to operate as a computer test apparatus and execute a computer test method. In the method, apparatus and program according to the second embodiment, a part of a plurality of registers designated by operands in instructions are input-only registers. In addition, in the method, apparatus and program according to the second embodiment, an input-only register is designated as an operand in a specific type of instruction to generate a test instruction array. The method, apparatus and program according to the second embodiment sets an initial value which does not cause an exception interruption with some specific types of instruction to an input-only register.

Thus, the method, apparatus and program according to the second embodiment can suppress the occurrence of an exception interruption and exception processing efficiently and in advance. Therefore, the method, apparatus and program according to the second embodiment can replace the value of a register and perform a test without causing an exception interruption and exception processing.

The method, apparatus and program according to the second embodiment designate an input-only register as an operand to be used as a divisor if the instruction is a fixed point division when a test instruction array is generated and sets a value except for 0 as an initial value to the input-only register. Thus, the method, apparatus and program according to the second embodiment can avoid the occurrence of an exception interruption in a fixed point division.

The method, apparatus and program according to the second embodiment designates an input-only register as at least one operand if the instruction is a floating point arithmetic when a test instruction array is generated. The method, apparatus and program according to the second embodiment uses a value which prevents the occurrence of an exception interruption in a floating point arithmetic as an initial value to be set to an input-only register even with any value of other input values to be used in the floating point arithmetic. Thus, the method, apparatus and program according to the second embodiment can avoid the occurrence of an exception interruption in a floating point arithmetic.

The method, apparatus and program according to the second embodiment sequentially executes a plurality of instructions included in a test instruction array and evaluates the execution results. Thus, the method, apparatus and program according to the second embodiment cause a test target apparatus to execute the test instruction array a plurality of number of times and compare the execution results for evaluation. In this case, the test target apparatus generates a comparison target in the test instruction array during a test. Therefore, a seed value is changed to repeat the test so that the operation test in a long period of time can be implemented easily.

In generating a test instruction array, the method, apparatus and program according to the second embodiment logical ORs between the AND between random data and AND data which is first data and OR data which is second data to generate instructions included in the test instruction array. The first data and second data are defined for each instruction type. The first data includes 0 as a bit value in the range corresponding to the register to be used as an output destination of the execution result of an instruction. Thus, the method, apparatus and program according to the second embodiment controls a register number relating to the output of an instruction by easy processing.

The method, apparatus and program according to the second embodiment sets bit values in the range corresponding to a register to be used as an input of an instruction as the first data and second data. Thus, the register number relating to input of an instruction can be controlled by performing easy processing.

In order to generates a test instruction array, the method, apparatus and program according to the second embodiment further uses the register designated as an output destination of a execution result of an instruction as an input of the subsequent instruction. Thus, a test instruction array which causes a conflict upon execution can be generated. Therefore, the method, apparatus and program according to the second embodiment can avoid the occurrence of an exception interruption in a conflict test.

The method, apparatus and program according to the second embodiment further uses data which designates, for each instruction type, whether the register designated as an output destination of an execution result of the preceding instruction can be used as an input or not to generate a test instruction array to be used in a conflict test. Thus, the method, apparatus and program according to the second embodiment excludes an input-only register from a conflict register to generate a test instruction array for a conflict test.

The method, apparatus and program according to the second embodiment uses a register table with which an output register is registered and from which the registered output register is deleted if it is designated as an input register of the subsequent instruction to generate a test instruction array for a conflict test. Therefore, the method, apparatus and program according to the second embodiment can generates a test instruction array for a conflict test easily.

Third Embodiment

A third embodiment is a variation example of a test program according to a second embodiment. A computer is tested in a logic design stage and in a stage of manufacturing actual apparatuses. For a computer actually manufactured, it is effective to execute a test instruction array a plurality of number of times and compare the results, as already described.

On the other hand, in the logic design stage, a computer is virtually built on a simulator. Thus, the processing capability of the computer is limited by the capability of the simulator. Therefore, it is desirable to execute the test instruction array with another apparatus in advance for a test in the logic design stage and generate an expected value. The generation of the expected value in advance allows a computer virtually built on a simulator to be evaluated only by the execution of a test instruction array once and comparison between the execution result and the expected value.

Figure 23:
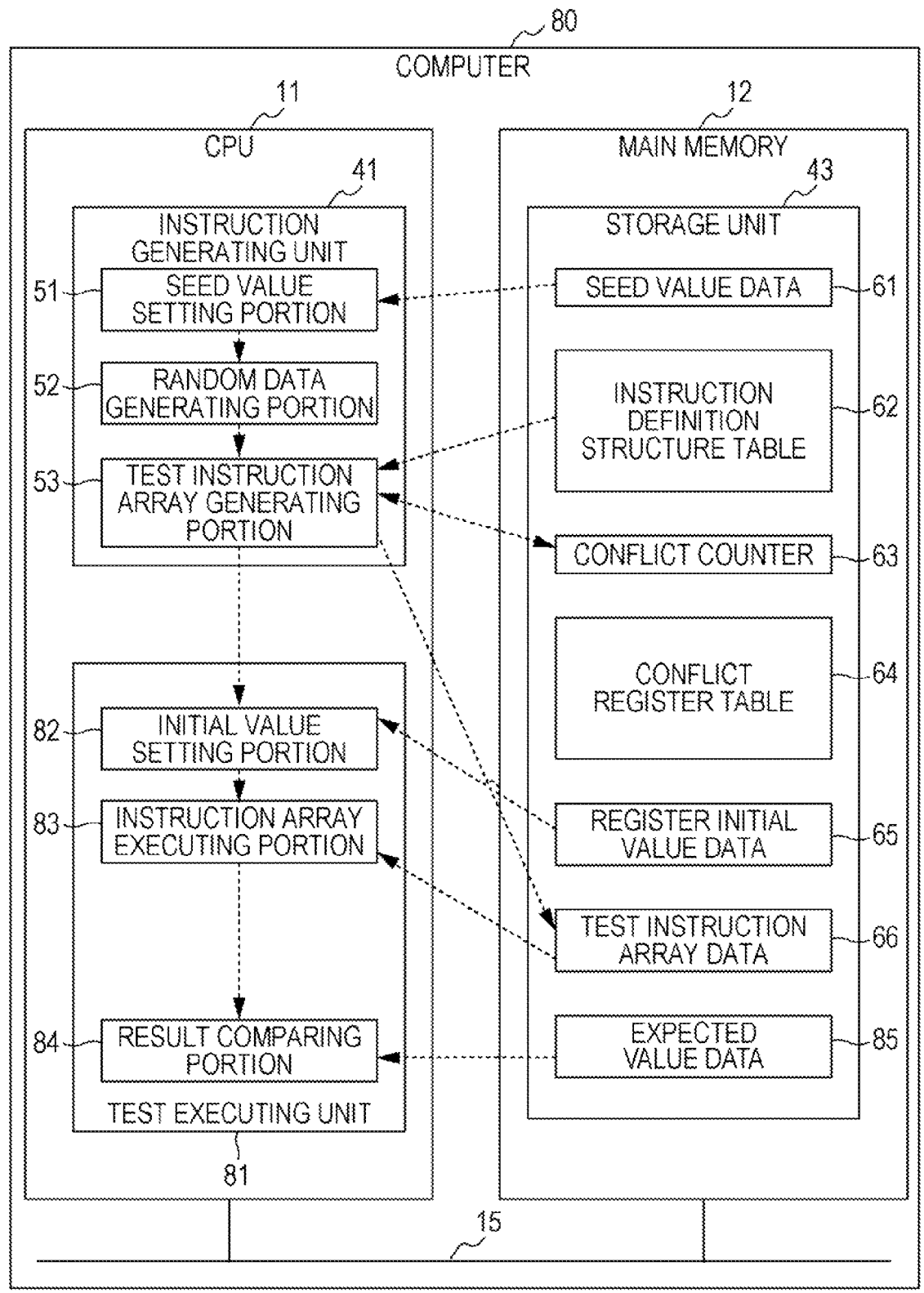
FIG. 23 is an explanatory diagram of a computer which executes a test program according to a third embodiment.

FIG. 23 is an explanatory diagram of a computer which executes a test program according to the third embodiment. In a computer 80 illustrated in FIG. 23, a CPU 11 executes a test program to implement functions of an instruction generating unit 41 and test executing unit 81. The CPU 11 having executed a test program uses the main memory 12 as a storage unit 43. The configuration and operations of the instruction generating unit 41 are the same as those of the second embodiment. Therefore, like numbers refer to like components, and the description will be omitted.

The storage unit 43 holds seed value data 61, instruction definition structure table 62, conflict counter 63, conflict register table 64, and expected value data 85 in advance. The expected value data 85 is a result of generation in advance of a test instruction array from the seed value data 61. In order to generates the same instruction array as that when the expected value data 85 is acquired, the instruction generating unit 41 uses the same seed value data 61 to generate the test instruction array data 66.

Figure 24:
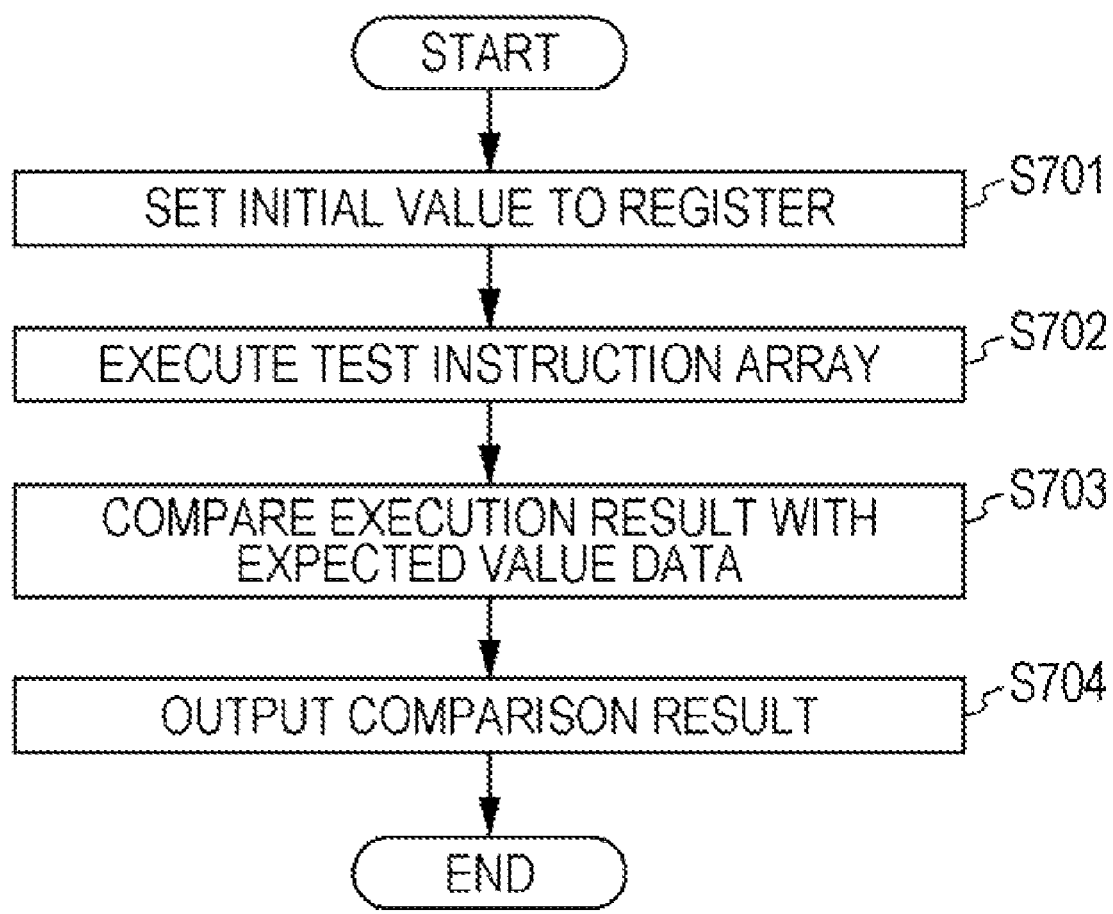
FIG. 24 is a flowchart describing processing by a test executing unit.

The test executing unit 81 has an initial value setting portion 82, an instruction array executing portion 83, and a result comparing portion 84. FIG. 24 is a flowchart describing processing by the test executing unit 81. If the test execution processing starts, the initial value setting portion 82 sets an initial value to a register (S701). Here, the initial value set by the initial value setting portion 82 may be required to the same value as that for the generation of the expected value data 85. For that, the register initial value data 65 used for the generation of the expected value data 85 is prestored in the storage unit 43, and the initial value setting portion 82 reads and uses the register initial value data 65. Alternatively, the initial value setting portion 82 may acquire the register initial value data 65 from the seed value data 61 upon execution of a test. If the initial value setting portion 82 acquires the register initial value data 65 upon execution of a test, the initial value setting portion 82 may use the same seed value data 61 as that for the generation of the expected value so that the same initial value as that for the generation of the expected value.

After the initial value is set to the register, the instruction array executing portion 83 reads and executes the test instruction array data 66 (S702). After the execution of the instruction array ends, the result comparing portion 84 compares and evaluates the expected value data 85 stored in the storage unit 43 and the execution result (S703) and outputs the comparison result (S704). Then, the processing ends.

As described above, a computer test method acquired by a test program according to the third embodiment executes a test instruction array and acquires the expected value in advance. Thus, even when the test instruction array is executed once by the test target computer apparatus, the execution result can be evaluated. In this way, acquiring the expected value in advance can reduce the load on the test target apparatus. Therefore, the method which executes a test instruction array and acquires the expected value in advance is particularly effective for a test on a simulator and is applicable to a test for the actual computer. Alternatively, a test instruction array may be executed a plurality of number of times, and the execution results may be compared. Furthermore, the execution results and the expected value data may be compared.

The methods, apparatuses and programs disclosed in the first to third embodiments are given for illustration purpose, and the configurations and operations may be changed and implemented as required. For example, the methods, apparatuses and programs according to the first to third embodiments handle the half of the register set as input-only registers. However, the ratio and/or number of input-only registers in the register set may be changed and implemented as required.

Similarly, having descried according to the second embodiment, a floating point register set and a general-purpose register set are both used, the disclosed technology is applicable to a case where an arbitrary register set is used to execute a test.

Having described according to the first to third embodiments that a computer uses as an operand an instruction having two or three input registers and one output register, for example, the disclosed technology is applicable to an instruction having any operand. The flowcharts referred according to the first to third embodiments may be changed by adding and/or deleting a process and/or changing the sequence, as required.

According to an embodiment of the present art, one information processing device delivers firmware concerned to another information processing device. Therefore, firmware updating may be attained with no provision of a firmware delivering device dedicated to firmware delivery.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A method of testing a computer, the method comprising:
designating a register as an input-only register having a setting of a value which does not cause an exception interruption with an execution of a specific type of instruction;
generating a test instruction array having a plurality of instructions for a test, by assigning a register excluding the input-only register as an output destination of an execution result of each of the plurality of instructions;
executing the plurality of instructions included in the generated test instruction array; and
evaluating the execution results by the computer.

2. The method according to claim 1, wherein the computer assigns the input-only register as a register which holds an input value to be used as a divisor in the generating when the specific type of instruction is a fixed point division and sets a value except for 0 as an initial value to the input-only register.

3. The method according to claim 1, wherein the computer assigns the input-only register as a register which holds an input value of a floating point arithmetic in the generating when the specific type of instruction is a floating point arithmetic, the input-only register having an initial input value which prevents occurrence of an exception interruption in the floating point arithmetic.

4. The method according to claim 1, wherein the computer executes the plurality of instructions included in the test instruction array more than one time and the evaluating compares the execution results.

5. The method according to claim 1, wherein the computer generates the test instruction array by executing OR processing between AND processed data and first data which is defined for each of the instruction types to generate an instruction included in the test instruction array, the AND processed data being obtained by executing AND processing between random data and second data which is defined for each of the instruction types and includes 0 in bit values in the range corresponding to the register to be used as an output destination of the execution result of an instruction.

6. The method according to claim 1, wherein the computer assigns a register designated to be the output destination of an execution result of instruction as a register which holds an input value of a subsequent instruction in the generating.

7. The method according to claim 1, wherein the computer compares expected value data acquired in advance with the execution result of the test instruction array.

8. A computer test apparatus comprising:
a designating unit that designates a register as an input-only register having a setting of a value which does not cause an exception interruption with an execution of a specific type of instruction;
a generating unit that generates a test instruction array having a plurality of instructions for a test by assigning a register excluding the input-only register as an output destination of an execution of each of the plurality of instructions;
an executing unit that executes the plurality of instructions included in the generated test instruction array; and
an evaluating unit that evaluates the execution results.

9. The computer test apparatus according to claim 8, wherein the generating unit assigns the input-only register as a register which holds an input value to be used as a divisor in the generating when the specific type of instruction is a fixed point division and sets a value except for 0 as an initial value to the input-only register.

10. The computer test apparatus according to claim 8, wherein the generating unit assigns the input-only register as a register which holds an input value of a floating point arithmetic in the generating when the specific type of instruction is a floating point arithmetic, the input-only register having an initial input value which prevents occurrence of an exception interruption in the floating point arithmetic.

11. The computer test apparatus according to claim 8, wherein the executing unit executes the plurality of instructions included in the test instruction array more than one time and the evaluating compares the execution results.

12. The computer test apparatus according to claim 8, wherein the generating unit generates the test instruction array by executing OR processing between AND processed data and first data which is defined for each of the instruction types to generate an instruction included in the test instruction array, the AND processed data being obtained by executing AND processing between random data and second data which is defined for each of the instruction types and includes 0 in bit values in the range corresponding to the register to be used as an output destination of the execution result of an instruction.

13. The computer test apparatus according to claim 8, wherein the generating unit assigns a register designated to be the output destination of an execution result of instruction as a register which holds an input value of a subsequent instruction in the generating.

14. The computer test apparatus according to claim 8, wherein the evaluating unit compares expected value data acquired in advance with the execution result of the test instruction array.

15. A non-transitory computer-readable medium that stores a computer program causing a computer test apparatus to execute a process comprising:
designating a register as an input-only register having a setting of a value which does not cause an exception interruption with an execution of a specific type of instruction;
generating a test instruction array having a plurality of instructions for a test by assigning a register excluding the input-only register as an output destination of an execution result of each of the plurality of instructions;
executing the plurality of instructions included in the generated test instruction array; and
evaluating the execution results by the computer.

* * * * *